United States Patent
Harshey et al.

(10) Patent No.: US 11,038,427 B1
(45) Date of Patent: Jun. 15, 2021

(54) CHARGE-CYCLE CONTROL FOR BURST-MODE DC-DC CONVERTERS

(71) Applicant: NXP B.V., Eindhoven (NL)

(72) Inventors: Jitendra Prabhakar Harshey, Bangalore (IN); Hendrik Johannes Bergveld, Eindhoven (NL); Edevaldo Pereira da Silva, Jr., Austin, TX (US); Koteswararao Nannapaneni, Yelahanka (IN); Uday Kumar Sajja, Vetapalem (IN)

(73) Assignee: NXP B.V., Eindhoven (NL)

( * ) Notice: Subject to any disclaimer, the term of this patent is extended or adjusted under 35 U.S.C. 154(b) by 32 days.

(21) Appl. No.: 16/734,999

(22) Filed: Jan. 6, 2020

(51) Int. Cl.
*H02M 3/158* (2006.01)
*H02M 1/00* (2006.01)

(52) U.S. Cl.
CPC .. *H02M 3/1588* (2013.01); *H02M 2001/0009* (2013.01)

(58) Field of Classification Search
CPC ...... H02M 3/155; H02M 3/156; H02M 3/157; H02M 3/158; H02M 3/1588; H02M 1/00; H02M 2001/0035; H02M 2001/0009
See application file for complete search history.

(56) References Cited

U.S. PATENT DOCUMENTS

| | | | |
|---|---|---|---|
| 5,982,160 A | 11/1999 | Walters et al. | |
| 6,724,174 B1 | 4/2004 | Esteves et al. | |
| 7,030,596 B1 | 4/2006 | Salerno et al. | |
| 7,432,695 B2 | 10/2008 | Salerno | |
| 7,750,615 B2 | 7/2010 | Jung et al. | |
| 7,936,160 B1* | 5/2011 | Sheehan | H02M 3/156 323/285 |
| 8,093,876 B2 | 1/2012 | Araki et al. | |
| 9,071,143 B2 | 6/2015 | Teh | |
| 9,152,193 B2 | 10/2015 | Costa et al. | |
| 10,141,830 B1* | 11/2018 | Chung | H05B 45/385 |
| 10,720,838 B1 | 7/2020 | Harshey et al. | |
| 10,784,783 B1 | 9/2020 | Harshey et al. | |
| 2008/0030178 A1 | 2/2008 | Leonard et al. | |

(Continued)

FOREIGN PATENT DOCUMENTS

CN 102347688 B 12/2014
JP 4841329 B2 12/2011

OTHER PUBLICATIONS

Szepesi, Thomas, "Stabilizing the Frequency of Hysteretic Current-Mode DC/DC Converters," IEEE Transactions on Power Electronics, Oct. 1987, pp. 302-312, vol. PE-2, No. 4, IEEE.

(Continued)

*Primary Examiner* — Adolf D Berhane
(74) *Attorney, Agent, or Firm* — Rajeev Madnawat

(57) ABSTRACT

A DC-DC converter operates in a burst mode having at least one charge cycle with a charging phase followed by a discharging phase. A charging phase is terminated when an inductor current flowing through an inductance connected to the DC-DC converter reaches a compensated peak-current threshold, wherein the compensated peak-current threshold compensates for charging-phase loop delay. A discharging phase is terminated when the inductor current reaches a compensated valley-current threshold, wherein the compensated valley-current threshold compensates for discharging-phase loop delay.

14 Claims, 14 Drawing Sheets

(56) References Cited

U.S. PATENT DOCUMENTS

2011/0243216 A1    10/2011   Yoshioka et al.
2013/0332765 A1    12/2013   Costa et al.
2021/0006160 A1*   1/2021   Wu .................... H02M 3/158

OTHER PUBLICATIONS

Notice of Allowance for U.S. Appl. No. 16/737,623, 8 pgs, (dated Jul. 1, 2020).

* cited by examiner

CHARGE-CYCLE CONTROL FOR BURST-MODE DC-DC CONVERTERS

TECHNICAL FIELD

The present disclosure is related to electronics and more particularly to burst-mode direct-current-to-direct-current (DC-DC) voltage converters and related voltage regulation for integrated circuits and the like.

BACKGROUND

Many existing electronic products rely upon low-power or battery-powered operation of one or more integrated circuits (ICs). These integrated circuits can be used in a wide variety of low-power or battery-operated applications including, for example, mobile phones, smart watches, sensing applications, or other low-power or battery-operated devices or applications. For many low-power ICs, an external voltage (e.g., from a battery) is converted to a lower voltage and regulated on-chip using a DC-DC converter that operates using switched output drivers that control power switches to control energy storage and release to and from reactive components. The DC-DC converters are controlled to maintain an output voltage that is provided to a load on the integrated circuit irrespective of variations in the input voltage and/or the load current.

Compared to a linear regulator, a DC-DC converter, whether using capacitive or inductive reactive components, can achieve a higher power efficiency, especially for large differences between the higher input voltage and the lower output voltage. Compared to using capacitive reactive components, using an inductive DC-DC converter has the advantage that, for different input and/or desired output voltages, the desired output voltage can be maintained by changing the timing of how the power switches are controlled, instead of changing the voltage conversion topology as would be needed for a capacitive DC-DC converter. However, maintaining a good power efficiency at low output power still remains a challenge.

Applying burst-mode control has advantages because good power efficiency can be maintained over a large load-current range. In conventional burst-mode DC-DC converters, the voltage regulation control is designed such that the DC-DC converter performs switching of the power switches only after the output voltage drops to a certain defined low-voltage threshold. This minimizes the converter switching actions and increases efficiency, especially for low output power since the DC-DC converter switches only when really needed. For burst-mode DC-DC converters, a burst includes one or more charge cycles that are performed by the DC-DC converter for a short period of time after detecting that the output voltage has reached a low-voltage threshold. During a burst, the DC-DC converter typically operates in continuous-conduction mode (CCM) with a controlled inductor current while ramping up the output voltage from the defined low-voltage threshold to a defined high-voltage threshold. Thus, the output voltage of such a burst-mode DC-DC converter is controlled to be within a voltage-regulation window defined by the low- and high-voltage thresholds.

For burst-mode implementations, the switching activity of the DC-DC converter (i.e., the frequency and/or duration of bursts) increases with the load current. If the load current increases, then the output capacitor for the DC-DC converter is drained faster. As soon as the low-voltage threshold of the voltage-regulation window is reached, a burst is started. For high load conditions, bursts with longer durations are typically needed because the load current subtracts from the inductor current during each burst. The resulting lower current into the output capacitor causes the output voltage to rise more slowly, thereby extending the duration of each burst. Furthermore, since the load current draws energy from the output capacitor between bursts, during high load conditions, the bursts typically need to be more frequent. Thus, both the burst frequency and the burst duration typically depend on the load current. Further, within a burst, in order to satisfy the output load, the inductor valley- and peak-current thresholds that define the burst-mode charge cycles are selected to ensure that the average inductor current is sufficient to achieve the output current for the maximum allowable output load. In other words, the average inductor current during the burst should be higher than the maximum load current to ensure that the DC-DC converter can continue operating in burst mode even for the maximum allowable load current. As soon as the high-voltage threshold is reached, the burst is ended by stopping the switching of the DC-DC converter, such that the output load draws energy exclusively from the output capacitor until the low-voltage threshold of the voltage-regulation window is again reached and another burst is started.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Embodiments are disclosed that provide techniques for controlling charge cycles for burst-mode DC-DC converters.

The techniques described herein can be used with any suitable type of burst-mode DC-DC converter such as (without limitation) a buck converter, a boost converter, or a buck-boost converter. Further, it is noted that the disclosed techniques can also be used with other types of DC-DC converters, including hybrid power converters containing both inductors and capacitors, such as multi-level DC-DC converters, where charge cycles are used to raise an output voltage to a high-voltage threshold after detecting that the output fell to a low-voltage threshold. Other variations and advantages can also be implemented while taking advantage of the techniques described herein.

Figure 1:
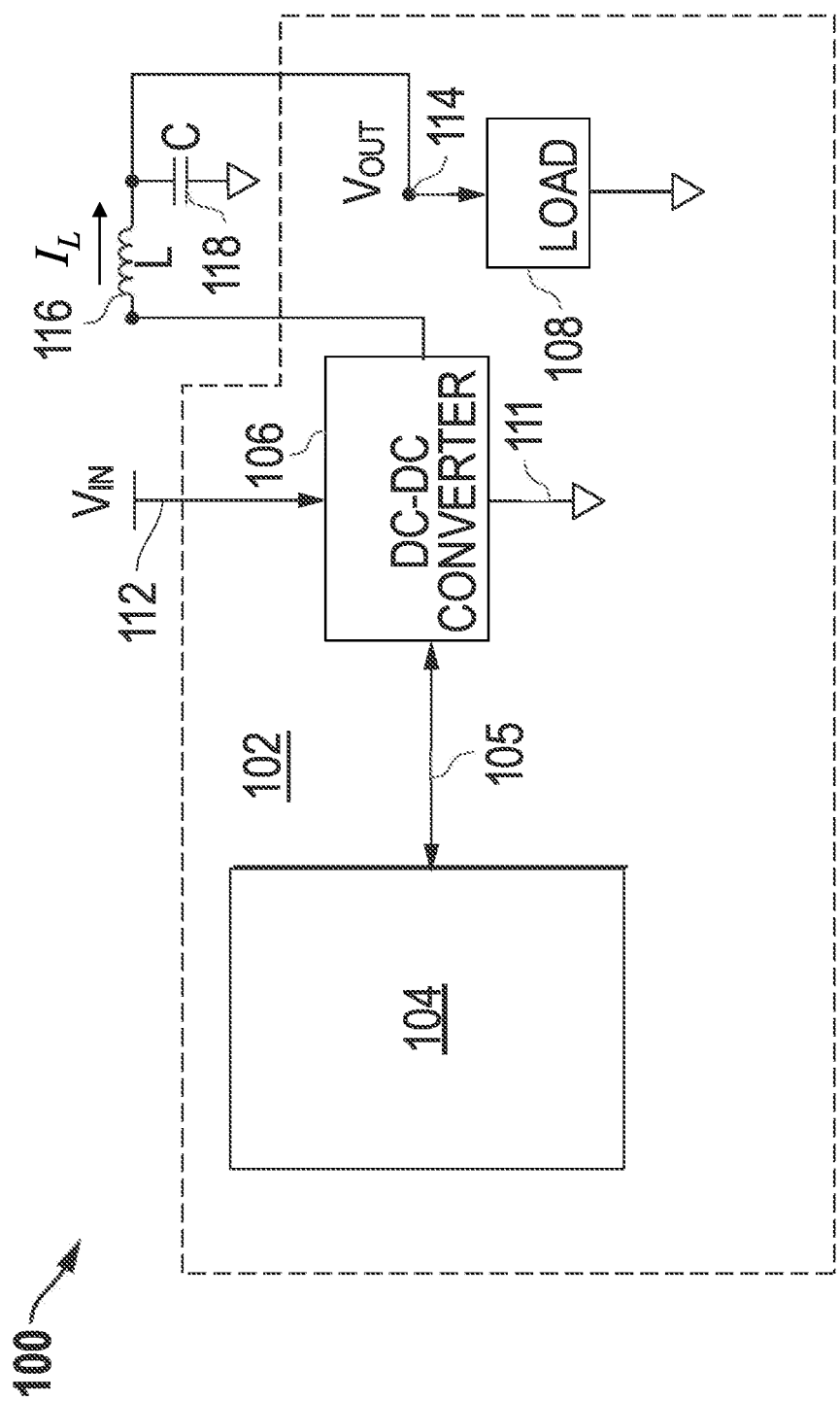
FIG. 1 is a schematic block diagram of an example embodiment including an integrated circuit (IC) having a DC-DC converter controlled by control signals asserted by a controller, external to the DC-DC converter, but on the same IC.

FIG. 1 is a schematic block diagram of an example embodiment 100 including an integrated circuit (IC) 102 having a DC-DC converter 106 controlled by control signals 105 asserted by a controller 104, external to the DC-DC converter 106, but on the same IC 102. The DC-DC converter 106 is powered by and coupled between an external supply voltage ($V_{in}$) 112 and ground 111. The DC-DC converter 106 operates to charge an output capacitance (C) 118 through an inductance (L) 116 to provide an output voltage ($V_{out}$) 114 to a load 108.

In the example embodiment 100, the controller 104 and the load 108 are implemented within the IC 102, and the inductance 116 and the capacitance 118 are implemented off chip. In alternative embodiments, (i) the controller 104 and/or the load 108 may be external to the IC 102 and/or (ii) the inductance 116 and/or the capacitance 118 may be implemented within the IC 102. It is further noted that the inductance 116 can be provided by one or more inductors, and the capacitance 118 can be provided by one or more capacitors. Different and/or additional circuits (not shown in FIG. 1) can also be included within the IC 102.

Figure 2:
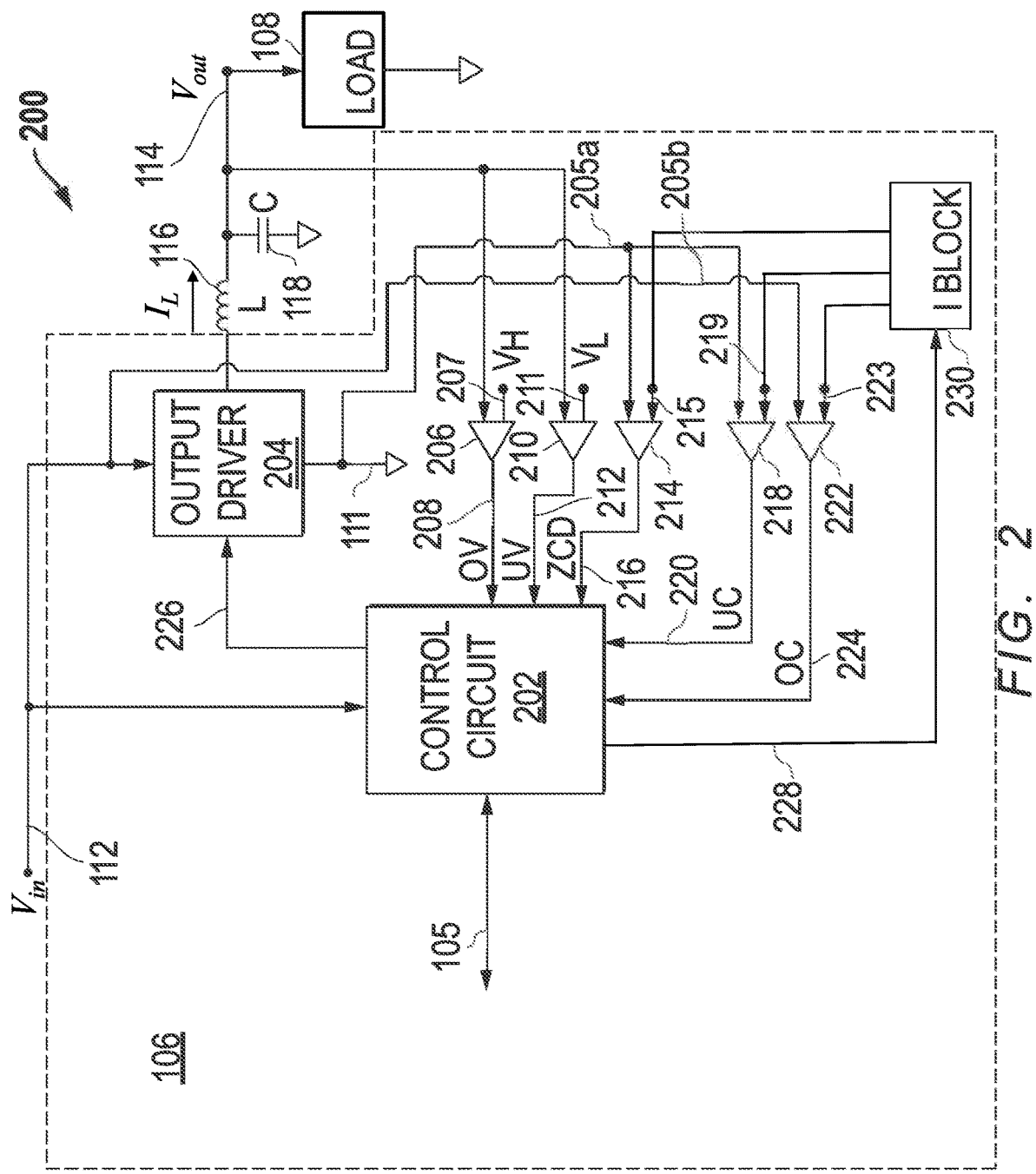
FIG. 2 is a schematic diagram of a portion of the example embodiment of FIG. 1 showing further circuit details for the DC-DC converter.

FIG. 2 is a schematic diagram of a portion of the example embodiment 100 of FIG. 1 showing further circuit details for the DC-DC converter 106. As shown in FIG. 2, the DC-DC converter 106 includes a control circuit 202 and an output driver 204. The external voltage supply 112 is coupled to supply the input voltage $V_{in}$ to power the control circuit 202 and the output driver 204. The control circuit 202 receives control signals 105 from the controller 104 of FIG. 1 and outputs drive signals 226 to the output driver 204.

The control circuit 202 can be implemented as a dedicated logic circuit, dedicated controller, or other hardware digital solution that implements the control actions and functions described herein. The control circuit 202 can also be implemented as a microcontroller, a processor, a programmable logic device, or other programmable circuit that executes program instructions stored in a non-volatile data storage device to carry out the control actions and functions described herein.

As described further below, the drive signals 226 are capable of turning on and off high-side and low-side power switches (e.g., $SW_H$ and $SW_L$ in FIGS. 6, 7, and 13) in the output driver 204. When the high-side power switch $SW_H$ is turned on and the low-side power switch $SW_L$ is turned off, the output driver 204 connects the supply voltage 112 to charge the capacitance 118 through the inductance 116 to deliver the output voltage 114 to the load 108. When the high-side power switch $SW_H$ is turned off and the low-side power switch $SW_L$ is turned on, the output driver 204 disconnects the supply voltage 112 such that energy stored in the inductance 116 and the capacitance 118 is used to deliver the output voltage 114 to the load 108.

A burst of the DC-DC converter burst-mode operation consists of multiple charge cycles of reciprocally switching on and off the high-side and low-side power switches $SW_H$ and $SW_L$ to charge the capacitance 118 until the output voltage $V_{out}$ reaches a specified high-voltage threshold $V_H$. Each charge cycle during a burst consists of (i) a charging phase during which the high-side power switch $SW_H$ in the output driver 204 is turned on and the low-side power switch $SW_L$ is turned off and (ii) a discharging phase during which the high-side power switch $SW_H$ is turned off and the low-side power switch $SW_L$ is turned on. The current $I_L$ flowing through the inductance 116 increases during each charging phase and decreases during each discharging phase. As long as the inductor current $I_L$ is greater than the load current, the output voltage $V_{out}$ at the capacitance 118 will increase. When the DC-DC converter 106 is designed and operating properly, the voltage increase during the charging phase of a charge cycle and the beginning of the charge-cycle's discharging phase is greater than any voltage decrease during the end of the charge-cycle's discharging phase, such that the output voltage $V_{out}$ has a net increase with each charge cycle.

A burst is initiated when the output voltage $V_{out}$ drops to a low-voltage threshold $V_L$, and a burst is terminated when the output voltage $V_{out}$ reaches the high-voltage threshold $V_H$.

During a burst, which typically consists of a number of charge cycles, each charging phase of a current charge cycle is terminated and the discharging phase is initiated when the inductor current $I_L$ reaches a specified peak-current threshold $I_{peak}$. Analogously, each discharging phase is terminated and the charging phase of the next charge cycle is initiated when the inductor current $I_L$ reaches a specified valley-current threshold $I_{valley}$. The peak and valley currents $I_{peak}$ and $I_{valley}$ are selected such that the average inductor current $I_{ave}$ (i.e., $(I_{peak}+I_{valley})/2$) is greater than the inductor current level needed to satisfy the maximum load current. In that case, there will be a net increase in the energy stored in the capacitance 118 with every charge cycle of the DC-DC converter 106, such that the output voltage $V_{out}$ will eventually rise to the high-voltage threshold $V_H$ at which point the high-side power switch $SW_H$ in the output driver 204 is turned off. The low-side power switch $SW_L$ in the output driver 204 remains on until the inductor current $I_L$ ramps down to zero, at which point the low-side switch $SW_L$ is turned off, thereby terminating the burst. Both power switches $SW_H$ and $SW_L$ will remain off, and the inductor current $I_L$ will remain at zero until the output voltage $V_{out}$ falls to the low-voltage threshold $V_L$ and another burst is initiated.

The control circuit 202 receives certain monitor signals to facilitate internal control of the DC-DC converter 106. In particular, as shown in FIG. 2, the control circuit 202 receives an over-voltage (OV) detection signal 208, an under-voltage (UV) detection signal 212, a zero-current detection (ZCD) signal 216, an under-current (UC) detection signal 220, and an over-current (OC) detection signal 224. In alternative embodiments, different and/or additional monitor signals can be provided depending upon operational functions desired for the DC-DC converter 106.

The OV detection signal 208 is used to detect when the output voltage ($V_{out}$) 114 rises above the high-voltage threshold $V_H$. For the example detector circuit shown in FIG. 2, a high-voltage comparator 206 is coupled to compare the output voltage 114 to the high-voltage threshold $V_H$ (207) to generate the OV detection signal 208 such that the OV detection signal 208 is high when the output voltage $V_{out}$ is greater than the high-voltage threshold $V_H$ and otherwise the OV detection signal 208 is low. In some implementations, a voltage divider (not shown) can be used to divide the output voltage down to a lower voltage level for the comparison.

The UV detection signal 212 is used to detect when the output voltage ($V_{out}$) 114 falls below the low-voltage threshold $V_L$. For the example detector circuit shown in FIG. 2, a low-voltage comparator 210 is coupled to compare the output voltage 114 to the low-voltage threshold $V_L$ (211) to generate the UV detection signal 212 such that the UV detection signal 212 is high when the output voltage $V_{out}$ is less than the low-voltage threshold $V_L$ and otherwise the UV detection signal 212 is low. In some implementations, the same voltage divider is used to divide down the output voltage for the comparison.

The ZCD detection signal 216 is used to indicate when the inductor current $I_L$ has fallen back to zero at the end of a burst. For the example detector circuit shown in FIG. 2, a ZCD current comparator 214 is coupled to compare (i) a scaled version 205a of a low-side sensed current from the output driver connection path to ground 111 to (ii) a ZCD reference current 215 (i.e., zero current) to generate the ZCD detection signal 216 such that the ZCD detection signal 216 is high when the scaled low-side sensed current 205a is sufficiently close to the ZCD reference current 215, and otherwise the ZCD detection signal 216 is low.

The UC detection signal 220 is used to detect when the scaled low-side sensed current 205a for the output driver 204 falls below a scaled version of the valley current $I_{valley}$. For the example detector circuit shown in FIG. 2, a low-current comparator 218 is coupled to compare the scaled low-side sensed current 205a to the scaled valley current $I_{valley}$ (219) to generate the UC detection signal 220 such that the UC detection signal 220 is high when the scaled low-side sensed current 205a is below the scaled valley current $I_{valley}$ and otherwise the UC detection signal 220 low.

The OC detection signal 224 is used to detect when a scaled version 205b of a high-side sensed current from the output driver connection path from the voltage supply 112 rises above a scaled version of the peak current $I_{peak}$. For the example detector circuit shown in FIG. 2, a high-current comparator 222 is coupled to compare the scaled high-side sensed current 205b to the scaled peak current $I_{peak}$ (223) to generate the OC detection signal 224 such that the OC detection signal 224 is high when the scaled high-side sensed current 205b is above the scaled peak current $I_{peak}$ and otherwise the OC detection signal 224 is low.

As shown in FIG. 2, the DC-DC converter 106 has a current (I) block 230 that generates the zero current reference current 215, the scaled valley current $I_{valley}$ 219, and the scaled peak current $I_{peak}$ 223 based on control signals 228 received from the control circuit 202.

Note that, in alternative implementations, the UC detection signal 220 can also be used as the ZCD detection signal 216 by changing the scaled valley current $I_{valley}$ (219) to zero when the OV detection signal 218 goes high. When the UV detection signal 212 goes high, the scaled valley current $I_{valley}$ (219) is restored to its non-zero value. In such implementations, the ZCD current comparator 214 and its inputs and outputs are omitted from FIG. 2.

Figure 3:
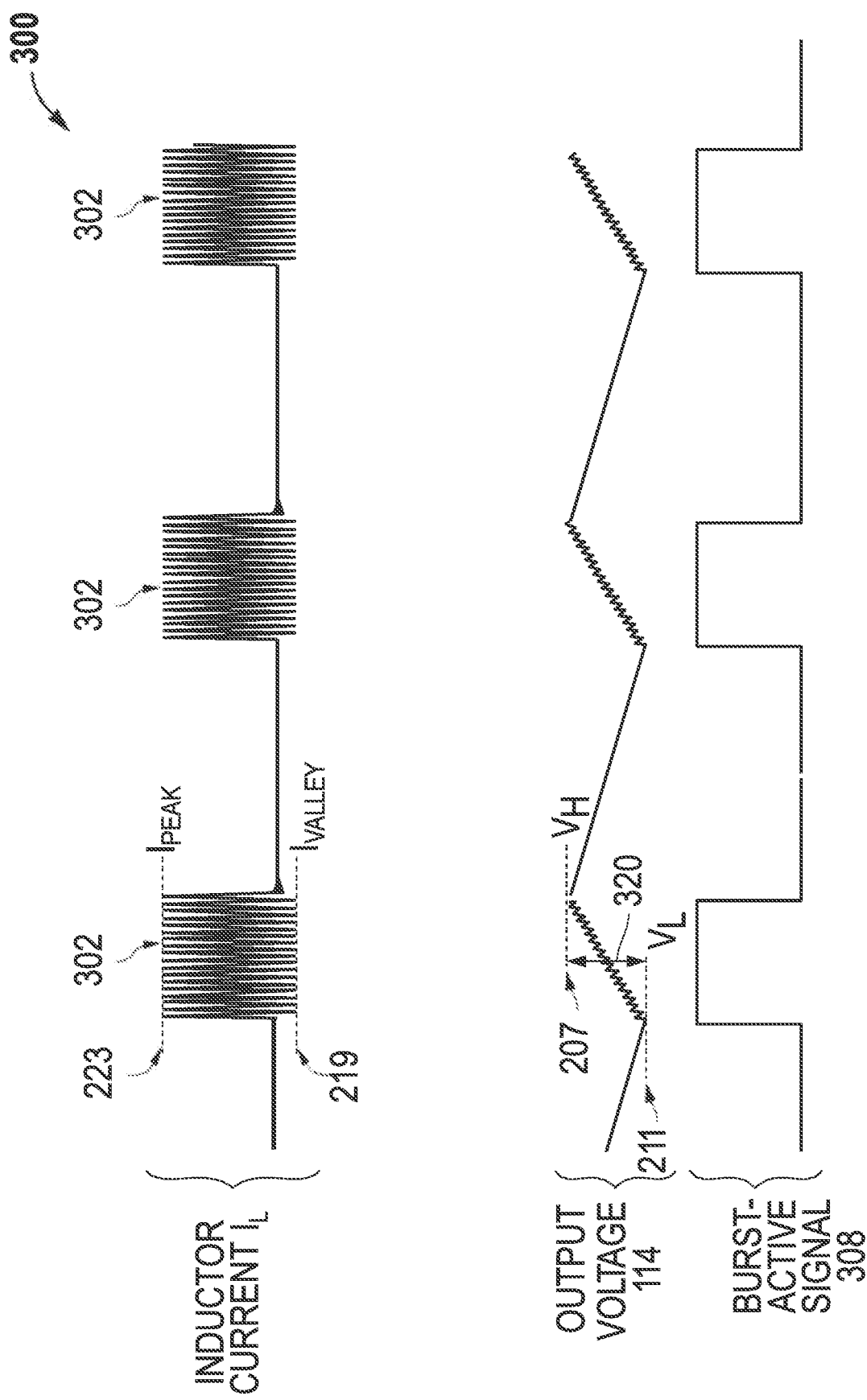
FIG. 3 provides an example timing diagram for the DC-DC converter 106 of FIGS. 1 and 2 during ideal burst-mode operations.

FIG. 3 provides an example timing diagram 300 for the DC-DC converter 106 during ideal burst-mode operations. FIG. 3 shows the inductor current $I_L$ through the inductance 116, the output voltage ($V_{out}$) 114, and a burst-active signal 308 generated by the control circuit 202 and which is driven high at the beginning of each burst and low at the end of each burst. Note that the burst-active signal may be considered to be part of the signals labeled 105 in FIGS. 1 and 2. During burst-mode operations, the DC-DC converter 106 maintains the output voltage 114 within a voltage-regulation window 320 between the high-voltage threshold ($V_H$) 207 and the low-voltage threshold ($V_L$) 211. This control is provided through burst events 302 for the DC-DC converter 106. Note that, in this particular implementation, the valley current $I_{valley}$ is negative. In other implementations, the valley current $I_{valley}$ may be zero or positive.

The DC-DC converter 106 ideally starts a new burst 302 through normal internal control as soon as the output voltage 114 reaches the low-voltage threshold ($V_L$) 211, at which time, the control circuit 202 asserts the burst-active signal 308. During each burst 302, the high-side and low-side power switches $SW_H$ and $SW_L$ in the output driver 204 are reciprocally cycled on and off multiple times where the inductor current $I_L$ is kept between the valley-current threshold ($I_{valley}$) (i.e., the UC reference current 219 of FIG. 2) and the peak-current threshold ($I_{peak}$) (i.e., the OC reference current 223 of FIG. 2). During each burst 302, the output voltage 114 rises from the low-voltage threshold ($V_L$) (i.e., the UV reference voltage 211 of FIG. 2) to the high-voltage threshold ($V_H$) (i.e., the OV reference voltage 207 of FIG. 2). In this ideal operation, as soon as the OV comparator 206 detects that the output voltage 114 has reached the high-voltage threshold ($V_H$) 207, the control circuit 202 turns off the high-side power switch $SW_H$ and, when the inductor current $I_L$ reaches zero, the burst 302 is terminated by the control circuit 202 turning off the low-side power switch $SW_L$ and driving the burst-active signal 308 low.

It is further noted that assertion of a burst-done signal could also be used by the control circuit 202 to indicate to controller 104 that the burst has completed, and this burst-done signal can be in addition to or instead of the burst-active signal 308. Other variations and additional, different, or fewer control signals can also be used while still taking advantage of the techniques described herein.

It is noted that FIG. 3 is described with signals being asserted with high logic levels and de-asserted with low logic levels. If desired, one or more of these signals could be implemented such that assertion is a low logic level and de-assertion is a high logic level. Further, the control signals could be adjusted to indicate an opposite action. For example, as indicated above, assertion of a burst-done signal could be used instead of de-assertion of a burst-active signal, and vice versa. Additional or different variations could also be implemented while still taking advantage of the techniques described herein.

Figure 4:
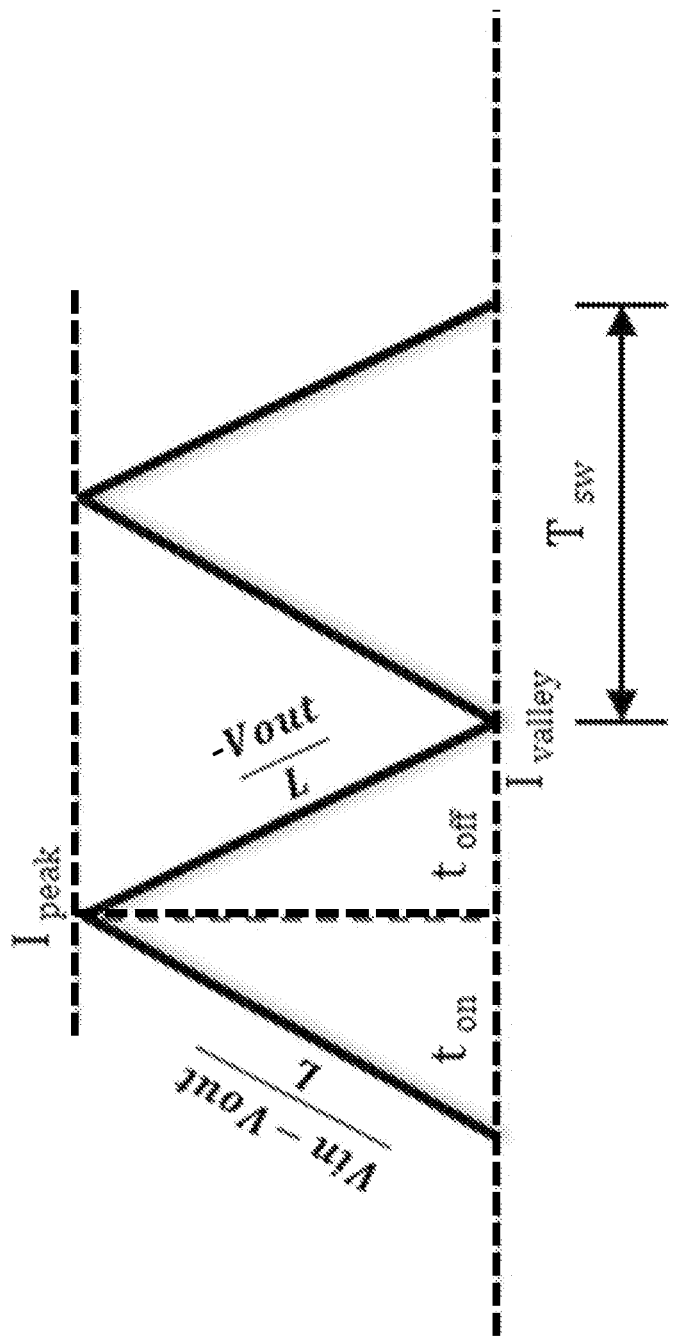
FIG. 4 is a graphical representation of the inductor current $I_L$ flowing through the inductance of FIGS. 1 and 2 as a function of time for two of the intermediate charge cycles during a burst of FIG. 3.

FIG. 4 is a graphical representation of the inductor current $I_L$ flowing through inductance 116 as a function of time for two of the intermediate charge cycles during a burst 302 of FIG. 3, where each charge cycle has a charging phase during which the inductor current $I_L$ rises followed by a discharging phase during which the inductor current $I_L$ falls. (Note that the initial charge cycle of each burst starts with the inductor current $I_L$ at 0, which will typically be different from the valley current valley, and that the final charge cycle of each burst ends with the inductor current $I_L$ at 0.) At the beginning of the charging phase of an intermediate charge cycle, the low-side power switch $SW_L$ in the output driver 204 of FIG. 2 is turned off followed soon after by the high-side power switch $SW_H$ being turned on, such that the inductor current $I_L$ rises from the valley current valley to the peak current $I_{peak}$, at which point the high-side power switch $SW_H$ is turned off followed soon after by the low-side power switch $SW_L$ being turned on to initiate the discharging phase of the charge cycle, during which the inductor current $I_L$ falls from the peak current $I_{peak}$ to the valley current $I_{valley}$, at which time the next charge cycle begins by again turning off the low-side power switch $SW_L$ and then turning on the high-side power switch $SW_H$.

In FIG. 4, $t_{on}$ is the duration of the charging phase of an intermediate charge cycle, and $t_{off}$ is the duration of the discharging phase, such that the total duration $T_{sw}$ of each intermediate charge cycle is ($t_{on}+t_{off}$). When the durations $t_{on}$ and $t_{off}$ of the charging and discharging phases are constant from charge cycle to charge cycle within a burst such that the total charge-cycle duration $T_{sw}$ remains constant during the burst, the frequency $F_{sw}$ of the charge cycles (i.e., $1/T_{sw}$) also remains constant during the burst.

As indicated in FIG. 4, the rate of change of the inductor current $I_L$ during the charging phase of each charge cycle is $$\left(\frac{V_{in} - V_{out}}{L}\right),$$

and the rate of change of the inductor current $I_L$ during the discharging phase of each charge cycle is $$\left(\frac{-V_{out}}{L}\right),$$

where $V_{in}$ is the input voltage 112, $V_{out}$ is the output voltage 114, and L is the inductance 116, such that the valley and peak currents $I_{valley}$ and $I_{peak}$ are related according to Equations (1) and (2) as follows:

$$I_{peak} = I_{valley} + t_{on}\frac{V_{in} - V_{out}}{L} \quad (1)$$

and $$I_{valley} = I_{peak} - t_{off}\frac{V_{out}}{L}, \quad (2)$$

Note that these equations are valid for buck converters, like the buck converter 106 of FIGS. 1 and 2. Those skilled in the art will understand how to derive corresponding equations for other types of DC-DC converters such as boost and buck-boost converters. In any case, for all such DC-DC converters, the inductor current $I_L$ rises and falls in an analogous manner during the charging and discharging phases of burst-mode charging cycles, albeit at different rates.

A particular instance of the DC-DC converter 106 of FIGS. 1 and 2 is designed to operate for specified ranges of input voltage levels $V_{in}$, output voltage levels $V_{out}$, and load current levels. For a specific application of the DC-DC converter 106 in which the expected input voltage $V_{in}$, the desired output voltage $V_{out}$, and the maximum load current, are known, the value for the inductance L (116 in FIGS. 1 and 2) is selected to achieve acceptable levels of efficiency and current ripple, and the value for the output capacitance C (118 in FIGS. 1 and 2) is selected to achieve an acceptable level of voltage ripple. In addition, the values for the inductor valley and peak currents $I_{valley}$ and $I_{peak}$ are selected to achieve a desired charge-cycle frequency $F_{sw}$ and to ensure that the average inductor current $I_{ave}$ (i.e., ($I_{valley}$+$I_{peak}$)/2) is sufficient to satisfy the maximum load current. In that case, the DC-DC converter 106 is configured to operate for the specified values of the input voltage $V_{in}$, the output voltage $V_{out}$, and the inductance L such that the durations $t_{on}$, $t_{off}$, and $T_{sw}$ and the frequency $F_{sw}$ are all known. Note that the charge-cycle frequency $F_{sw}$ is typically selected to avoid electromagnetic interference (EMI) associated with certain specific frequency ranges.

According to Equations (1) and (2), for constant values of the output voltage $V_{out}$, the inductance L, and the valley- and peak-current thresholds $I_{valley}$ and $I_{peak}$, a higher value for the input voltage $V_{in}$ decreases the duration $t_{on}$ of the charging phases, while maintaining the same value for the duration $t_{off}$ of the discharging phases, resulting in a higher charge-cycle frequency $F_{sw}$. Furthermore, for constant values of the input voltage $V_{in}$, the inductance L, and the valley- and peak-current thresholds $I_{valley}$ and $I_{peak}$, a higher value for the output voltage $V_{out}$ increases the duration $t_{on}$ of the charging phase, while decreasing the duration $t_{off}$ of the discharging phase, which might or might not affect the charge-cycle frequency $F_{sw}$. In addition, for constant values of the input voltage $V_{in}$, the output voltage $V_{out}$, and the valley- and peak-current thresholds $I_{valley}$ and $I_{peak}$, a higher value for the inductance L increases both the durations $t_{on}$ and $t_{off}$, resulting in a lower charge-cycle frequency $F_{sw}$.

Loop-Delay Compensation

If the DC-DC converter 106 were able to react instantaneously, then, for given values for the input voltage $V_{in}$, the output voltage $V_{out}$, and the inductance L, Equations (1) and (2) could be used to determine values for the valley- and peak-current thresholds $I_{valley}$ and $I_{peak}$ that would achieve a desired switch-cycle frequency $F_{sw}$.

In the real world, however, the DC-DC converter 106 is not able to react instantaneously. Instead, for example, when, during the charging phase of a burst-mode charge cycle, the rising inductor current $I_L$ reaches the peak-current threshold $I_{peak}$, it takes non-zero amounts of time (i) for the high-current comparator 222 of FIG. 2 to drive the OC detection signal 224 high, (ii) for the control circuit 202 to react to the assertion of the OC detection signal 224 to assert the drive signals 226, and (iii) for the output driver 204 to react to the assertion of the drive signals 226 to turn the high-side power switch $SW_H$ off and then the low-side power switch $SW_L$ on. In the meantime, during this overall processing delay, referred to herein as the charging-phase loop delay $T_{peak\_dly}$, the end of the charging phase and the corresponding beginning of the next discharging phase are delayed, such that the inductor current $I_L$ continues to rise beyond the peak-current threshold $I_{peak}$.

Similarly, when, during the discharging phase of a burst-mode charge cycle, the falling inductor current $I_L$ reaches the valley-current threshold $I_{valley}$, it takes non-zero amounts of time (i) for the low-current comparator 218 of FIG. 2 to drive the UC detection signal 220 high, (ii) for the control circuit 202 to react to the assertion of the UC detection signal 220 to de-assert the drive signals 226, and (iii) for the output driver 204 to react to the de-assertion of the drive signals 226 to turn the low-side power switch $SW_L$ off and then the high-side power switch $SW_H$ on. In the meantime, during this discharging-phase loop delay $T_{valley\_dly}$, the end of the discharging phase and the corresponding beginning of the next charging phase are delayed, such that the inductor current $I_L$ continues to fall below the valley-current threshold $I_{valley}$.

Figure 5:
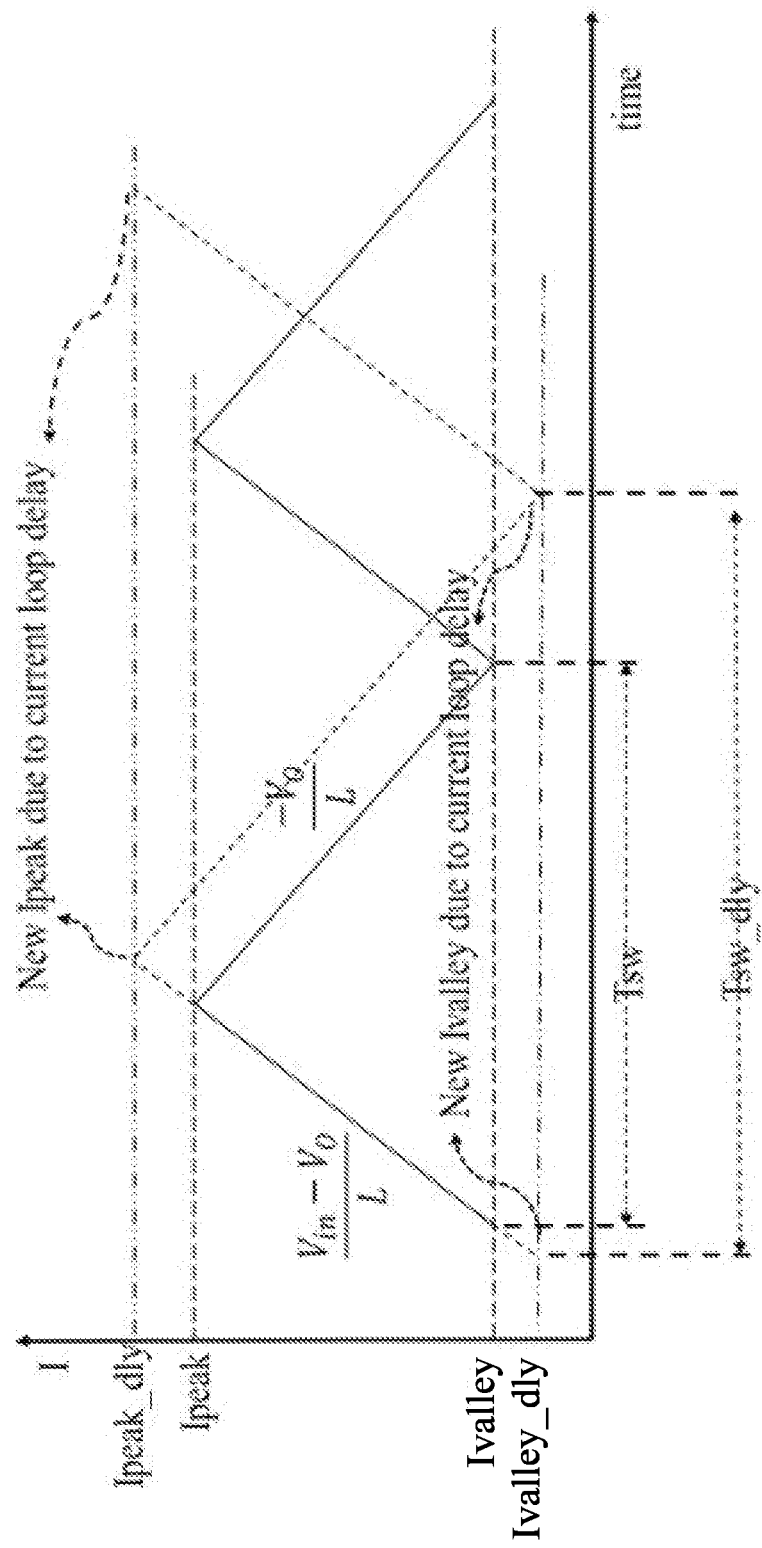
FIG. 5 is a graphical representation of the inductor current $I_L$ flowing through the inductance of FIGS. 1 and 2 as a function of time for two of the intermediate charge cycles during a burst of FIG. 3 that illustrates the impact of the charging-phase and discharging-phase loop delays in terminating the charging and discharging phases of the charge cycles due to the processing delays in real-world implementations of the DC-DC converter.

FIG. 5 is a graphical representation of the inductor current $I_L$ flowing through inductance 116 as a function of time for two of the intermediate charge cycles during a burst 302 of FIG. 3 that illustrates the impact of the charging-phase and discharging-phase loop delays in terminating the charging and discharging phases of the charge cycles due to the processing delays in real-world implementations of the DC-DC converter 106. In FIC. C, the solid curve represents the inductor current $I_L$ for instantaneous reaction by an ideal implementation of the DC-DC converter 106, while the dotted curve represents the inductor current $I_L$ for the delayed reaction by a real-world implementation of the DC-DC converter 106.

As shown in FIG. 5, in the real world, due to the charging-phase loop delay $T_{peak\_dly}$, the inductor current $I_L$ continues to rise after reaching the peak-current threshold $I_{peak}$ until the high-side and low-side power switches $SW_H$ and $SW_L$ can be switched, by which time the inductor current $I_L$ has risen to $I_{peak\_dly}$. Similarly, due to the discharging-phase loop delay $T_{valley\_dly}$, the inductor current $I_L$ continues to fall after reaching the valley-current threshold $I_{valley}$ until the high-side and low-side power switches can be switched, by which time the inductor current $I_L$ has fallen to $I_{valley\_dly}$. In addition, during each subsequent discharging phase, the inductor current $I_L$ begins falling from the higher initial current level $I_{peak\_dly}$ due to the previous charging-phase loop delay $T_{peak\_dly}$, and, during each subsequent charging phase, the inductor $I_L$ begins rising from the lower initial current level $I_{valley\_dly}$ due to the previous discharging-phase loop delay $T_{valley\_dly}$. All of this contributes to the overall charge-cycle duration $T_{sw\_dly}$ being longer than the desired duration $T_{sw}$ and the corresponding charge-cycle frequency $F_{sw\_dly}$ being lower than the desired frequency $F_{sw}$, which can result in undesirable EMI levels and increased current ripple. Furthermore, if the rise above the peak-current threshold $I_{peak}$ and the fall below valley-current threshold $I_{valley}$ are not equal (which they are usually not), then the average burst current will change which may affect the ability of the DC-DC converter 106 to deliver the desired maximum load current.

If the input voltage $V_{in}$, the output voltage $V_{out}$, and the inductance L were fixed and if the desired charge-cycle frequency $F_{sw}$ were known, then factory (or other) testing could be performed to determine the charging-phase and discharging-phase loop delays for the charging and discharging phases of the charge cycles for a real-world instance of the DC-DC converter 106. Those loop delays could then be taken into account to select the value $(I_{peak}-(I_{peak\_dly}-I_{peak}))$ or $(2*I_{peak}-I_{peak\_dly})$ for the OC reference current 223 of FIG. 2 and the value $(I_{alley}+I_{valley\_dly})$ or $(2*I_{valley}-I_{valley\_dly})$ for the UC reference current 219 of FIG. 2 that would achieve the desired charge-cycle duration $T_s$, and the desired charge-cycle frequency $F_{sw}$.

However, as described above, the DC-DC converter 106 is designed to operate for different applications having different values for the input voltage $V_{in}$, the output voltage $V_{out}$, and/or the inductance L, which can result in different values for $I_{peak\_dly}$ and/or $I_{valley\_dly}$ such that the results from factory testing for one possible application will not apply to all possible applications. Note that the charging-phase loop delay $T_{peak\_dly}$ and the discharging-phase loop delay $T_{valley\_dly}$ are fixed for a given real-world implementation of the DC-DC converter 106, but that the values for $I_{peak\_dly}$ and $I_{valley\_dly}$ will vary depending on $V_{in}$, $V_{out}$, and L for different applications of that real-world implementation.

To address these issues, certain embodiments of the DC-DC converter 106 of this disclosure have circuitry designed and configured to compensate for variations in one or more of the input voltage $V_{in}$, the output voltage $V_{out}$, and the inductance L to achieve a desired efficiency, a desired maximum load current, and a desired charge-cycle frequency $F_{sw}$ or at least to be within a desired range of the desired charge-cycle frequency $F_{sw}$.

Figure 6:
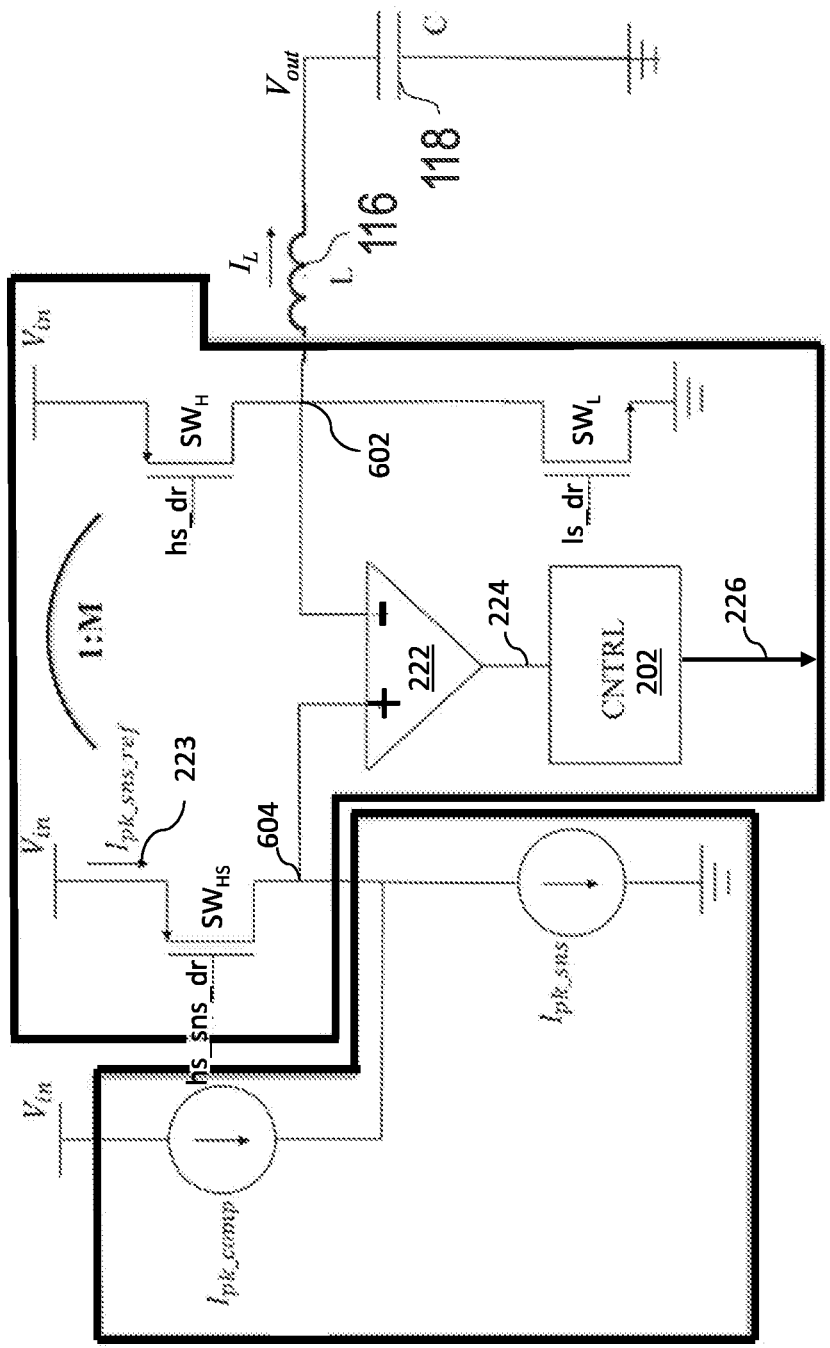
FIG. 6 is a schematic block diagram of a portion of the DC-DC converter of FIGS. 1 and 2 that is involved in detecting when to terminate an existing charging phase of a burst-mode charge cycle.

FIG. 6 is a schematic block diagram of a portion of the DC-DC converter 106 of FIGS. 1 and 2 that is involved in detecting when to terminate an existing charging phase of a burst-mode charge cycle. As shown in FIG. 6, the DC-DC converter 106 has a high-side, p-type field-effect transistor (FET) switch $SW_H$ and a low-side, n-type FET switch $SW_L$ that are part of the output driver 204 of FIG. 2 and whose drains are interconnected at the driver output port 602 which is in turn connected to the (external) inductance (L) 116 and thereby to the (external) output capacitance (C) 118. Note that, as understood by those skilled in the art, in alternative implementations, the high-side switch $SW_H$ could be implemented using an n-type FET. In that case, a so-called bootstrap circuit is provided to generate the appropriate the drive voltage when the high-side switch $SW_H$ is on.

FIG. 6 also shows the OC comparator 222 of FIG. 2, whose negative input is connected to the driver output port 602 and whose positive input is connected to the high-side current sense node 604, through which flows the charging-phase reference current $I_{pk\_sns\_ref}$ (i.e., the OC reference current 223 of FIG. 2) when the p-type FET, high-side sense switch $SW_{HS}$ is on. The charging-phase reference current $I_{pk\_sns\_ref}$ is generated by the peak sense current source $I_{pk\_sns}$ and the peak compensation current source $I_{pk\_comp}$, where $I_{pk\_sns\_ref}=I_{pk\_sns}-I_{pk\_comp}$.

The OC detection signal 224 generated by the OC comparator 222 is applied to the control circuit 202 of FIG. 2 and used to generate the drive signals 226, which include:

The high-side power drive signal hs_dr, which is applied to the gate of the high-side power switch $SW_H$;

The low-side power drive signal ls_dr, which is applied to the gate of the low-side power switch $SW_L$; and The high-side sense drive signal hs_sns_dr, which is applied to the gate of the high-side sense switch $SW_{HS}$.

In a typical real-world implementation, the transistor size of the high-side sense switch $SW_{HS}$ is M times smaller than the transistor size of the high-side power switch $SW_H$, where (M>1) in order to scale down the magnitude of the charging-phase reference current $I_{pk\_sns\_ref}$ to save power.

In certain embodiments, the peak sense current source $I_{pk\_sns}$ is designed to generate a current given by Equation (3) as follows:

$$I_{pk\_sns} = I_{peak}/M \qquad (3)$$

where $I_{peak}$ is the ideal peak-current threshold of FIGS. 3-5, and the peak compensation current source $I_{pk\_comp}$ is designed to generate a current given by Equation (4) as follows:

$$I_{pk\_comp} = T_{peak\_dly} * \frac{V_{in} - V_{out}}{M * L} \qquad (4)$$

where $T_{peak\_dly}$ is the fixed (e.g., factory-determined) charging-phase loop delay.

At the beginning of the charging phase of a burst-mode charge cycle, the drive signals hs_dr, ls_dr, and hs_sns_dr are all driven low, such that the switches $SW_H$ and $SW_{HS}$ are on, the switch $SW_L$ is off, the scaled (rising) current $I_L$ flowing through the inductance 116 will be lower than the charging-phase reference current $I_{pk\_sns\_ref}$, and the OC detection signal 224 will be low. Eventually, the inductor current $I_L$ will exceed the charging-phase reference current $I_{pk\_sns\_ref}$ causing the OC comparator 222 to drive the OC detection signal 224 high, which will in turn cause the control circuit 202 to drive the drive signals hs_dr and ls_dr high, thereby turning off the high-side power switch $SW_H$ and turning on the low-side power switch $SW_L$ to start the next discharging phase. Note that, in a practical circuit implementation, a dead time is guaranteed between switching off the high-side switch $SW_H$ and switching on the low-side switch $SW_L$ to prevent cross conduction. Note also that the drive signal hs_sns_dr remains low throughout a burst such that the high-side sense switch $SW_HS$ remains on throughout the burst to prevent transients associated with switching the sense circuitry on and off from leading to false triggers of the OC comparator 222. As indicated by its dependence on $V_{in}$, $V_{out}$, and L in Equation (4), the peak compensation current $I_{pk\_comp}$ will adjust the peak-current threshold for different values of $V_{in}$, $V_{out}$, and/or L such that the charging phase will be terminated at a lower peak-current threshold that compensates for the charging-phase loop delay $T_{peak\_dly}$, such that the switches will be thrown just as the inductor current $I_L$ reaches the ideal peak-current threshold $I_{peak}$.

Figure 7:
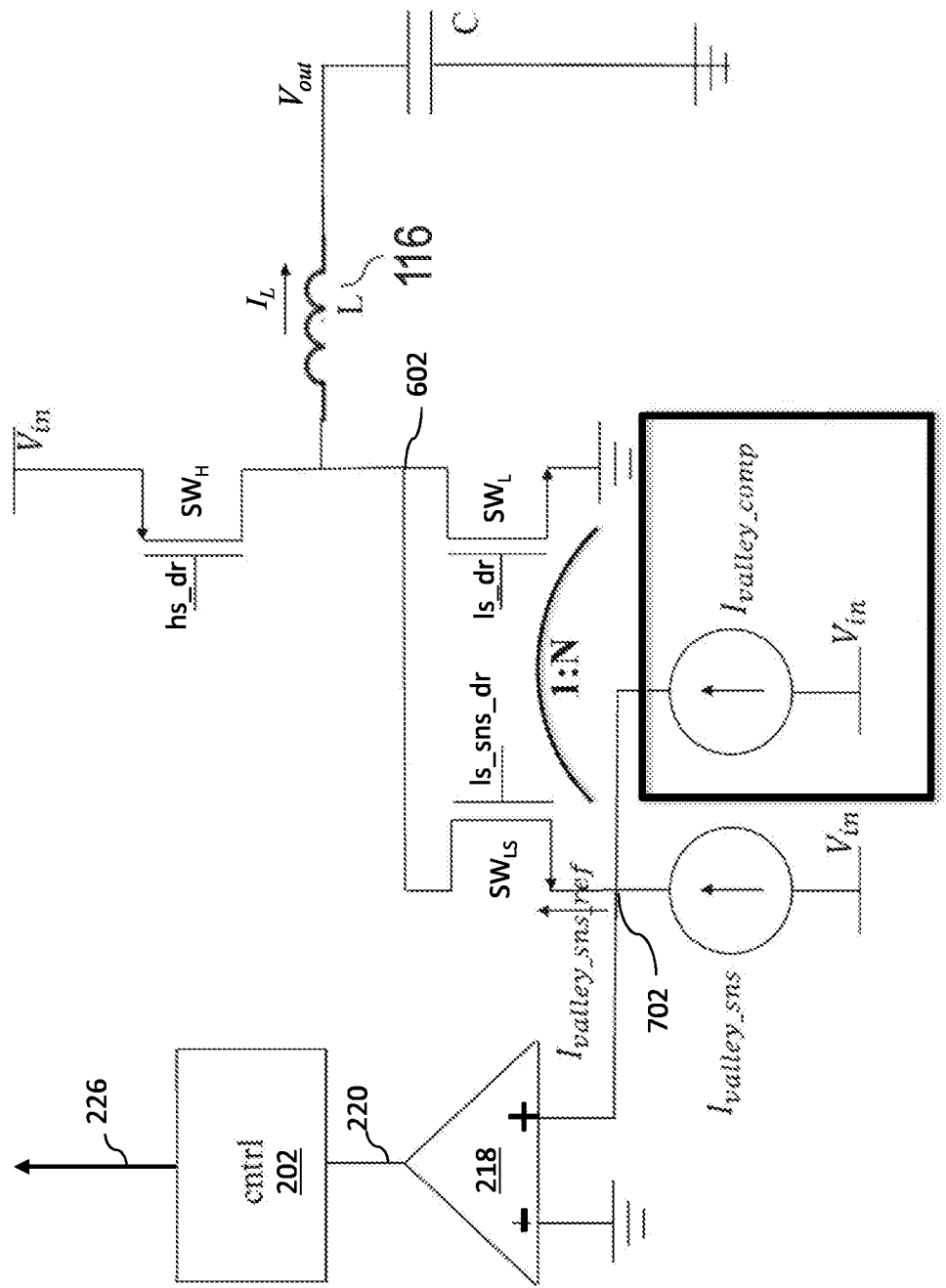
FIG. 7 is a schematic block diagram of a portion of the DC-DC converter of FIGS. 1 and 2 that is involved in detecting when to terminate an existing discharging phase of a burst-mode charge cycle.

FIG. 7 is a schematic block diagram of a portion of the DC-DC converter 106 of FIGS. 1 and 2 that is involved in detecting when to terminate an existing discharging phase of a burst-mode charge cycle. FIG. 7 shows the high-side power switch $SW_H$ and the low-side power switch $SW_L$ of FIG. 6.

FIG. 7 also shows the UC comparator 218 of FIG. 2, whose negative input is connected to ground and whose positive input is connected to the low-side sense node 702, through which flows the discharging phase reference current $I_{valley\_sns\_ref}$ (i.e., the UC reference current 219 of FIG. 2). The discharging phase reference current $I_{valley\_sns\_ref}$ is generated by the valley sense current source $I_{valley\_sns}$ and the valley compensation current source $I_{valley\_comp}$ when the n-type FET, low-side sense switch $SW_{LS}$ is turned on, where $I_{valley\_sns\_ref} = I_{valley\_sns} + I_{valley\_comp}$.

The UC detection signal 220 generated by the UC comparator 218 is applied to the control circuit 202 of FIG. 2 and used to generate the drive signals 226, which include:

The high-side power drive signal hs_dr, which is applied to the gate of the high-side power switch $SW_H$;

The low-side power drive signal ls_dr, which is applied to the gate of the low-side power switch $SW_L$; and The low-side sense drive signal ls_sns_dr, which is applied to the gate of the low-side sense switch $SW_{LS}$.

In a typical real-world implementation, the transistor size of the low-side sense switch $SW_{LS}$ is N times smaller than the transistor size of the low-side power switch $SW_L$, where (N>1) in order to scale down the magnitude of the discharging-phase reference current $I_{valley\_sns\_ref}$ to save power.

In certain embodiments, the valley sense current source $I_{valley\_sns}$ is designed to generate a current given by Equation (5) as follows:

$$I_{valley\_sns} = I_{valley}/N \qquad (5)$$

where $I_{valley}$ is the ideal valley-current threshold of FIGS. 3-5, and the valley compensation current source $I_{valley\_comp}$ is designed to generate a current given by Equation (6) as follows:

$$I_{valley\_comp} = T_{valley\_dly} * \frac{V_{out}}{N * L} \qquad (6)$$

where $T_{valley\_dly}$ is the fixed (e.g., factory-determined) discharging-phase loop delay.

At the beginning of the discharging phase of a charge cycle, the drive signals hs_dr, ls_dr, and ls_sns_dr are all driven high, such that the switches $SW_L$ and $SW_{LS}$ are on, the switch $SW_H$ is off, the (falling) current $I_L$ flowing through the inductance 116 will be higher than the discharging phase reference current $I_{valley\_sns\_ref}$, and the UC detection signal 220 will be low. Eventually, the scaled inductor current $I_L$ will fall below the discharging-phase reference current $I_{valley\_sns\_ref}$ causing the UC comparator 218 to drive the UC detection signal 220 high, which will in turn cause the control circuit 202 to drive the drive signals hs_dr and ls_dr low, thereby turning on the high-side power switch $SW_H$ and turning off the low-side power switch $SW_L$ to start the next charging phase. Again, an appropriate dead time will be ensured in a practical design to prevent cross conduction of the power switches. Note that the drive signal ls_sns_dr remains high throughout a burst such that the low-side sense switch $SW_{LS}$ remains on throughout the burst. As for the high-side current detection, this is done to prevent transients associated with switching the sense circuitry on and off during the burst from leading to false triggers of the UC comparator 218. As indicated by its dependence on $V_{out}$ and L in Equation (6), the valley compensation current $I_{valley\_comp}$ will adjust the valley-current threshold for different values of $V_{out}$ and/or L such that the discharging phase will be terminated at a higher valley-current threshold that compensates for the discharging phase loop delay $T_{valley\_dly}$, such that the switches will be thrown just as the inductor current $I_L$ reaches the ideal valley-current threshold $I_{valley}$.

Those skilled in the art will understand that, at the moment that the low-current comparator 218 trips, the drain, gate, and source voltages of the low-side sense switch $SW_{LS}$ are respectively equal to the drain, gate, and source voltages of the low-side power switch $SW_L$, indicating that the inductor current $I_L$ is equal to a scaled-up version of the discharging-phase reference current $I_{valley\_sns\_ref}$. Since the source of the low-side power switch $SW_L$ is connected directly to ground, connecting the negative input of the low-current comparator 218 to ground is equivalent to connecting the negative input to the source of the low-side power switch. Note that, at the start of the discharging phase, the drain voltage at the driver output port 602 will be negative, such that current will flow from the ground node through the low-side power switch $SW_L$ to the driver output port 602.

While the current flowing through the low-side power switch $SW_L$ is higher than the target valley current, the drain voltage, to which the low-side sense switch $SW_{LS}$ is also connected, is more negative than the drain voltage at the trip point. Since the discharging-phase reference current $I_{valley\_sns\_ref}$ through the low-side sense switch $SW_{LS}$ is a fixed current, this means that, at that moment, the source of the low-side sense switch $SW_{LS}$ is still below 0V. Therefore, the UC comparator 218 will not trip because the (zero) voltage at the comparator's negative input will be higher than the (negative) voltage at the comparator's positive input. As the current through the low-side power switch $SW_L$ drops, the drain voltage rises, pulling the source of the low-side sense switch $SW_{LS}$ up until it reaches 0V. At that moment, the low-side power switch current has reached $N*I_{valley\_sns\_ref}$. The valley compensation current $I_{valley\_comp}$ is chosen to be higher than the ideal valley sense current $I_{valley\_sns}$, such that, given the discharging-phase loop delay, the actual current level at which the low-side power switch $SW_L$ turns off is $N*I_{valley\_sns}$, which is the desired result.

With the compensation for the charging-phase loop delay $T_{peak\_dly}$ provided by the circuitry of FIG. 6 and with the compensation for the discharging-phase loop delay $T_{valley\_dly}$ provided by the circuitry of FIG. 7, real-world implementations of the DC-DC converter 106 are able to achieve the desired efficiency, maximum load current, and burst-mode charge-cycle frequency $F_{sw}$ for all of the different supported combinations of input voltage $V_{in}$, output voltage $V_{out}$, and inductance.

Assume, for example, an implementation of the DC-DC converter 106 of FIGS. 1, 2, 6, and 7 that is designed to operate for input voltages $V_{in}$ between 1.7V and 3.6V, output voltages $V_{out}$ between 0.7V and 2V, drop-out voltages ($V_{in}$–$V_{out}$) of a minimum of 500 mV, inductances L between 500 nH and 2.2 µH, output capacitances C between 6 µF and 14 µF, maximum load currents between 40 mA and 60 mA, and charge-cycle frequencies $F_{sw}$ between 2 MHz and 10 MHz, where (i) the high-side power switch $SW_H$ is M=1350 times larger than the high-side sense switch $SW_{HS}$ and (ii) the low-side power switch $SW_L$ is N=530 times larger than the low-side sense switch $SW_{LS}$. Assume further that the DC-DC converter 106 has a charging-phase loop delay $T_{peak\_dly}$ of 15 ns and a discharging-phase loop delay $T_{valley\_dly}$ of 15 ns. Note that, just because certain parameters have ranges of possible values, that does not mean that the DC-DC converter 106 will operate properly for every possible combination of those parameters within those ranges.

One possible application for that example implementation of the DC-DC converter 106 has an input voltage $V_{in}$ of 3V, an output voltage $V_{out}$ of 1.1V, an inductance L of an output capacitance C of 10 µF, a maximum load current of 50 mA, and a charge-cycle frequency $F_{sw}$ of 5 MHz. In that case, Equations (1) and (2) can be used to configure the DC-DC converter 106 to operate with an ideal peak current $I_{peak}$ of 169.3 mA, an ideal valley current $I_{valley}$ of 30 mA, a charging-phase duration $t_{on}$ of 73.3 ns, and a discharging phase duration $t_{off}$ of 126.6 ns.

Based on Equation (3), the peak sense current source $I_{pk\_sns}$ is configured to generate a current given by Equation (7) as follows:

$$I_{pk\_sns} = I_{peak}/M = 169.3\ \text{mA}/1350 = 125\ \mu A. \quad (7)$$

Based on Equation (4), the peak compensation current source $I_{pk\_comp}$ is configured to generate a current given by Equation (8) as follows:

$$I_{pk\_comp} = T_{peak\_dly} * \frac{V_{in} - V_{out}}{M*L} = 15ns * \frac{3V - 1.1V}{1350*1\mu H} = 21\mu A. \quad (8)$$

Based on Equation (5), the valley sense current source $I_{valley\_sns}$ is configured to generate a current given by Equation (9) as follows:

$$I_{valley\_sns} = I_{valley}/N = 30\ \text{mA}/530 = 57\ \mu A. \quad (9)$$

Based on Equation (6), the valley compensation current source $I_{valley\_comp}$ is configured to generate a current given by Equation (10) as follows:

$$I_{valley\_comp} = T_{valley\_dly} * \frac{V_{out}}{N*L} = 15ns * \frac{1.1V}{530*1\mu H} = 31\mu A. \quad (10)$$

Another possible application for that same example implementation of the DC-DC converter 106 has an input voltage $V_{in}$ of 2.5V, an output voltage $V_{out}$ of 1V, an inductance L of an output capacitance C of 10 µF, a maximum load current of 15 mA, and a charge-cycle frequency $F_{sw}$ of 6 MHz. In that case, Equations (1) and (2) can be used to configure the DC-DC converter 106 to operate with an ideal peak current $I_{peak}$ of 85 mA, an ideal valley current $I_{valley}$ of –15 mA, a charging-phase duration $t_{on}$ of 66.7 ns, and a discharging phase duration $t_{off}$ of 100 ns.

In that case, based on Equation (3), the peak sense current source $I_{pk\_sns}$ is configured to generate a current given by Equation (11) as follows:

$$I_{pk\_sns} = I_{peak}/M = 85\ \text{mA}/1350 = 63\ \mu A. \quad (11)$$

Based on Equation (4), the peak compensation current source $I_{pk\_comp}$ is configured to generate a current given by Equation (12) as follows:

$$I_{pk\_comp} = T_{peak\_dly} * \frac{V_{in} - V_{out}}{M*L} = 15ns * \frac{2.5V - 1V}{1350*1\mu H} = 17\mu A. \quad (12)$$

Based on Equation (5), the valley sense current source $I_{valley\_sns}$ is configured to generate a current given by Equation (13) as follows:

$$I_{valley\_sns} = I_{valley}/N = -15\ \text{mA}/530 = -28\ \mu A. \quad (13)$$

Based on Equation (6), the valley compensation current source $I_{valley\_comp}$ is configured to generate a current given by Equation (14) as follows:

$$I_{valley\_comp} = T_{valley\_dly} * \frac{V_{out}}{N*L} = 15ns * \frac{1V}{530*1\mu H} = 28\mu A. \quad (14)$$

Note that, by coincidence, since the delay time is 15 ns while the current is –15 mA and the slope is –1 A/µs, the compensated valley reference ends up at (–28.3 µA+28.3 µA)=0 µA.

Figure 8:
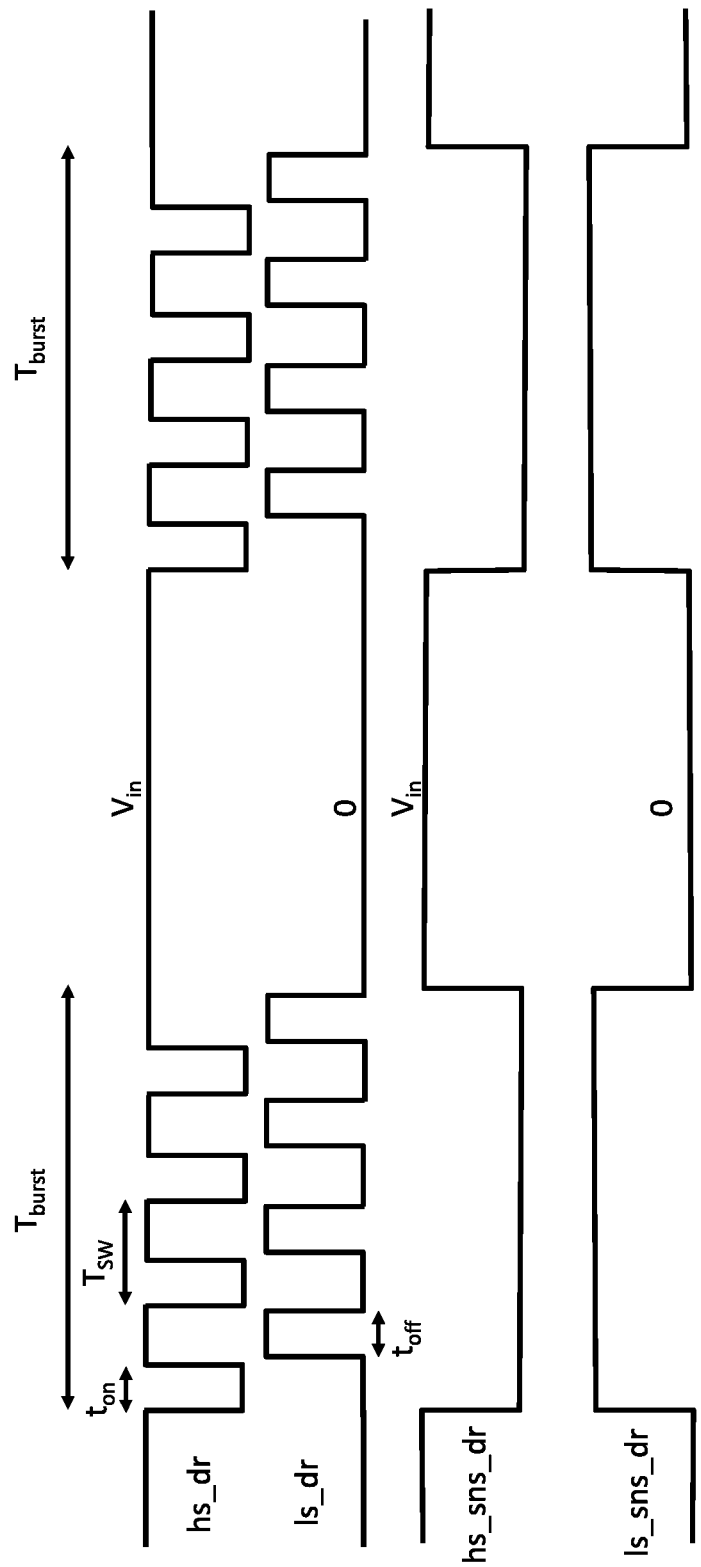
FIG. 8 is an example timing diagram showing the four drive signals of FIGS. 6 and 7 for two bursts separated by an off-burst period.

FIG. 8 is an example timing diagram showing the four drive signals of FIGS. 6 and 7 for two bursts separated by an off-burst period, where each burst has four charge cycles. As shown in FIG. 8, in order to avoid a cross-conduction current flowing directly from $V_{in}$ to ground at the beginning of each charging period ($T_{on}$), the high-side power drive signal hs_dr is driven low after the low-side power drive signal ls_dr has been driven low in order to ensure that the low-side power switch $SW_L$ has been turned off before the high-side power switch $SW_H$ is turned on. Similarly, in order to avoid a similar cross-conduction current at the beginning of each discharging period ($T_{off}$), the high-side power drive signal hs_dr is driven high before the low-side power drive signal ls_dr is driven high in order to ensure that the high-side power switch $SW_H$ has been turned off before the low-side power switch $SW_L$ is turned on.

As shown in FIG. 8, during each burst, the high-side sense drive signal hs_sns_dr is low (to turn on the high-side sense switch $SW_H$s) and the low-side sense drive signal ls_sns_dr is high (to turn on the low-side sense switch $SW_{LS}$).

At the end of each burst, the high-side power and sense drive signals hs_dr and hs_sns_dr are both driven high and the low-side power and sense drive signals ls_dr and ls_sns_dr are both driven low to turn off all four switches $SW_H$, $SW_{HS}$, $SW_L$, and $SW_{LS}$.

Figure 9:
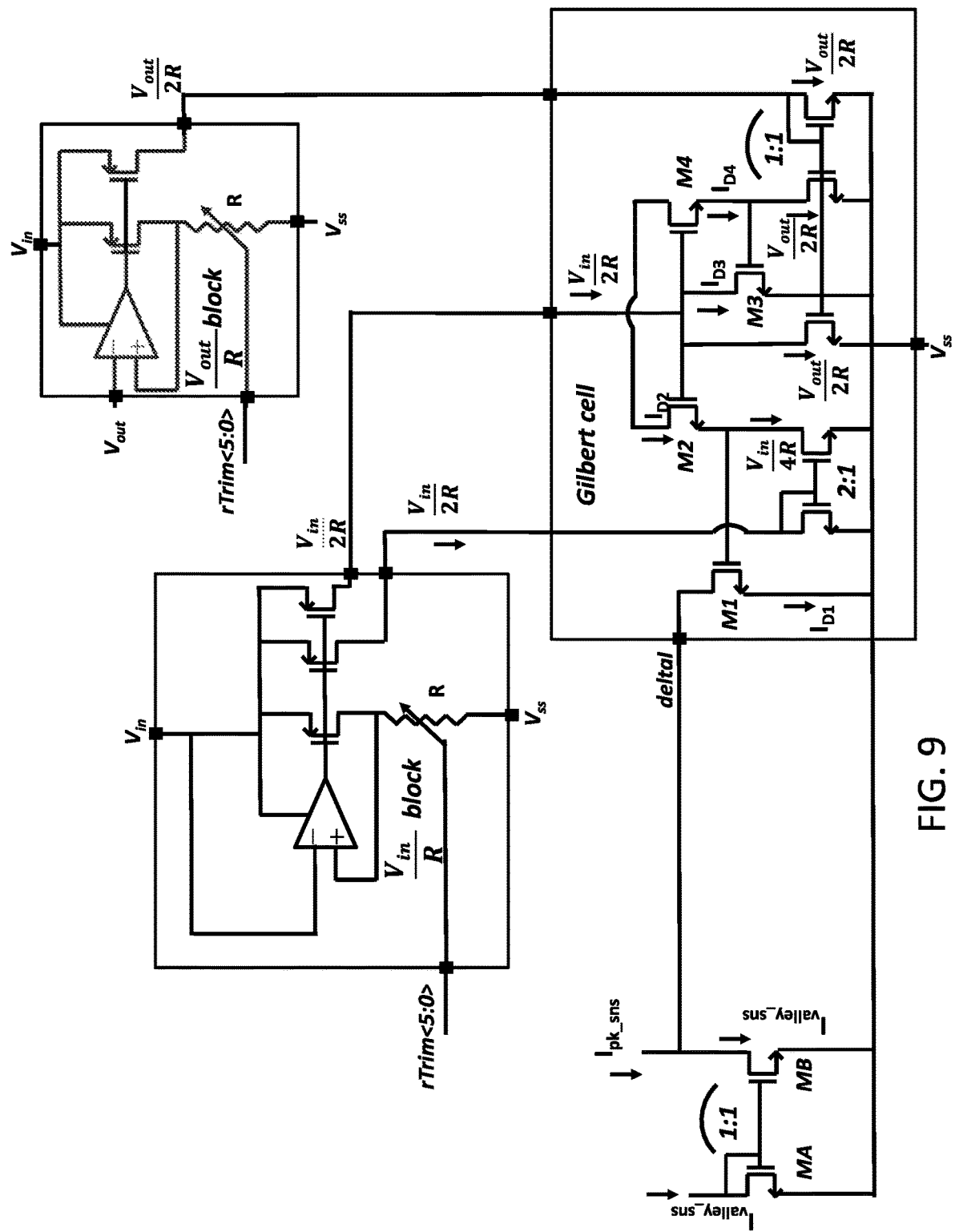
FIG. 9 is a schematic block diagram of one embodiment of the peak sense current source $I_{pk\_sns}$ of FIG. 6.

FIG. 9 is a schematic block diagram of one embodiment of the peak sense current source $I_{pk\_sns}$ of FIG. 6. On the top side of FIG. 9, two circuits generate currents that depend on $V_{in}$ and $V_{out}$, respectively. In both cases, the voltage ($V_{in}$ or $V_{out}$) is placed across a resistor R using an opamp-based feedback loop, and using a mirror ratio of 2:1, currents $V_{in}/2R$ and $V_{out}/R$ are obtained using the two indicated circuits. These two currents, and derivatives thereof, serve as inputs to the Gilbert cell, i.e., a current multiplier. Using the trans-linear loop of M1, M2, M3, and M4, it can be found that $I_{D1}=(I_{D3}*I_{D4}/I_{D2})$. When filling in the valid equations for $I_{D2}$, $I_{D3}$, and $I_{D4}$, it is found that:

$$I_{D2} = \frac{V_{in}}{4R},$$

$$I_{D3} = \frac{V_{in} - V_{out}}{2R},$$

and $$I_{D4} = \frac{V_{out}}{2R}.$$

Since $I_{D1}=(I_{D3}*I_{D4}/I_{D2})$, the following equation of the output current $I_{D1}$ is obtained:

$$I_{D1} = \frac{V_{OUT}}{R} - \frac{V_{OUT}^2}{RV_{IN}}$$

This current $I_{D1}$ is in fact the intended current ripple $I_{peak}-I_{valley}$ to obtain the desired switching frequency $F_{sw}$, where $R=L*F_{SW}$. Current $I_{D1}$ is then added to the intended valley current reference $I_{valley\_sns}$ to obtain the intended peak current reference $I_{pk\_sns}$. This current $I_{pk\_sns}$ then flows to $V_{ss}$ (i.e., ground) as shown in FIG. 6.

Figure 10:
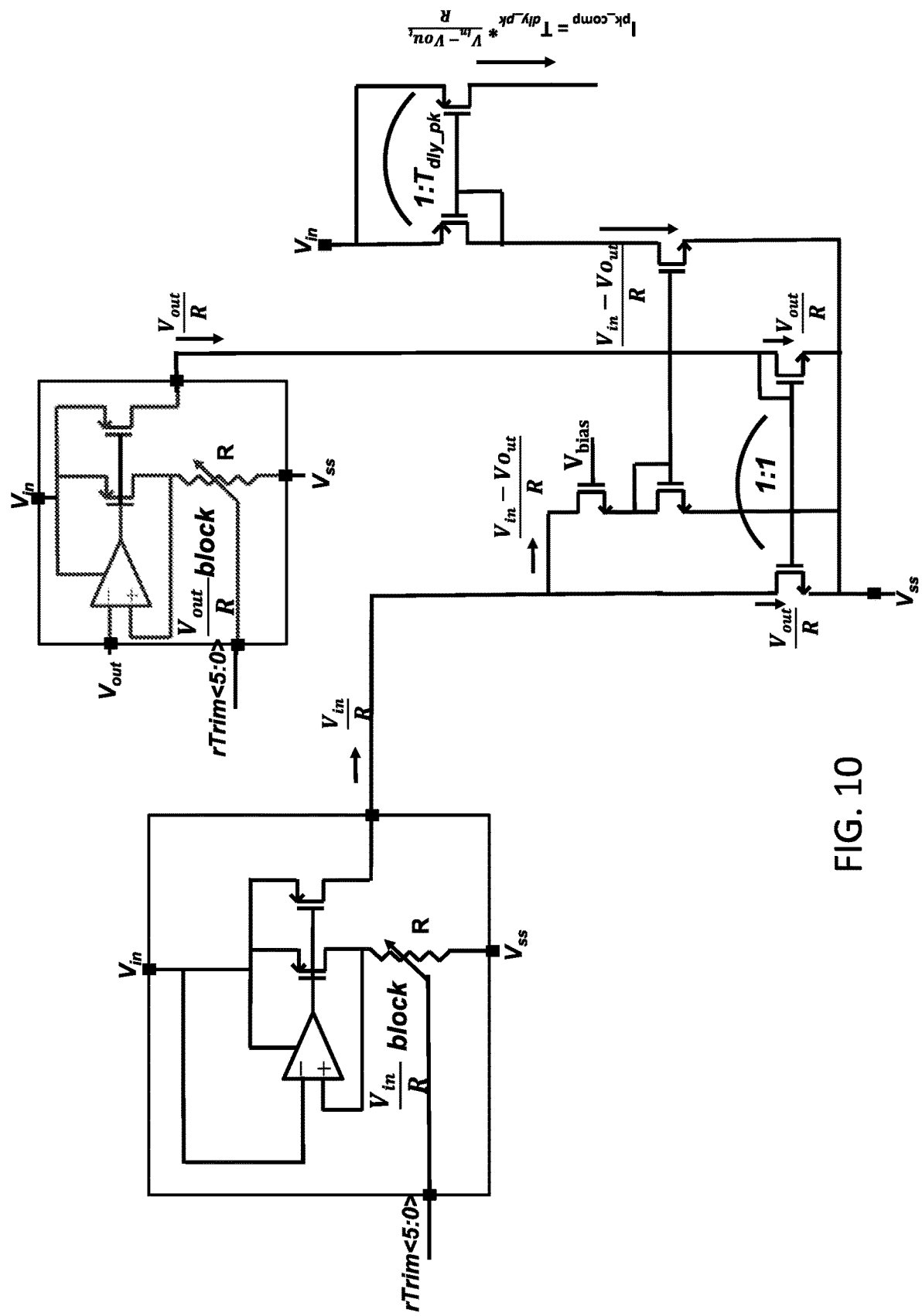
FIG. 10 is a schematic block diagram of one embodiment of the peak compensation current source $I_{pk\_comp}$ of FIG. 6.

FIG. 10 is a schematic block diagram of one embodiment of the peak compensation current source $I_{pk\_comp}$ of FIG. 6. Similar to the circuit in FIG. 9, two opamp-based circuits generate currents $V_{in}/R$ and $V_{out}/R$. These currents are then subtracted from each other using the 1:1 current mirror. Using another current mirror, the resulting current ($V_{in}$-$V_{out}$)/R is then multiplied by a defined value $T_{dly\_pk}$. The current $I_{pk\_comp}$ then flows from $V_{in}$, as shown in FIG. 6. If R is chosen/trimmed to be equal to M*L, then the desired Equation (4) is obtained.

Figure 11:
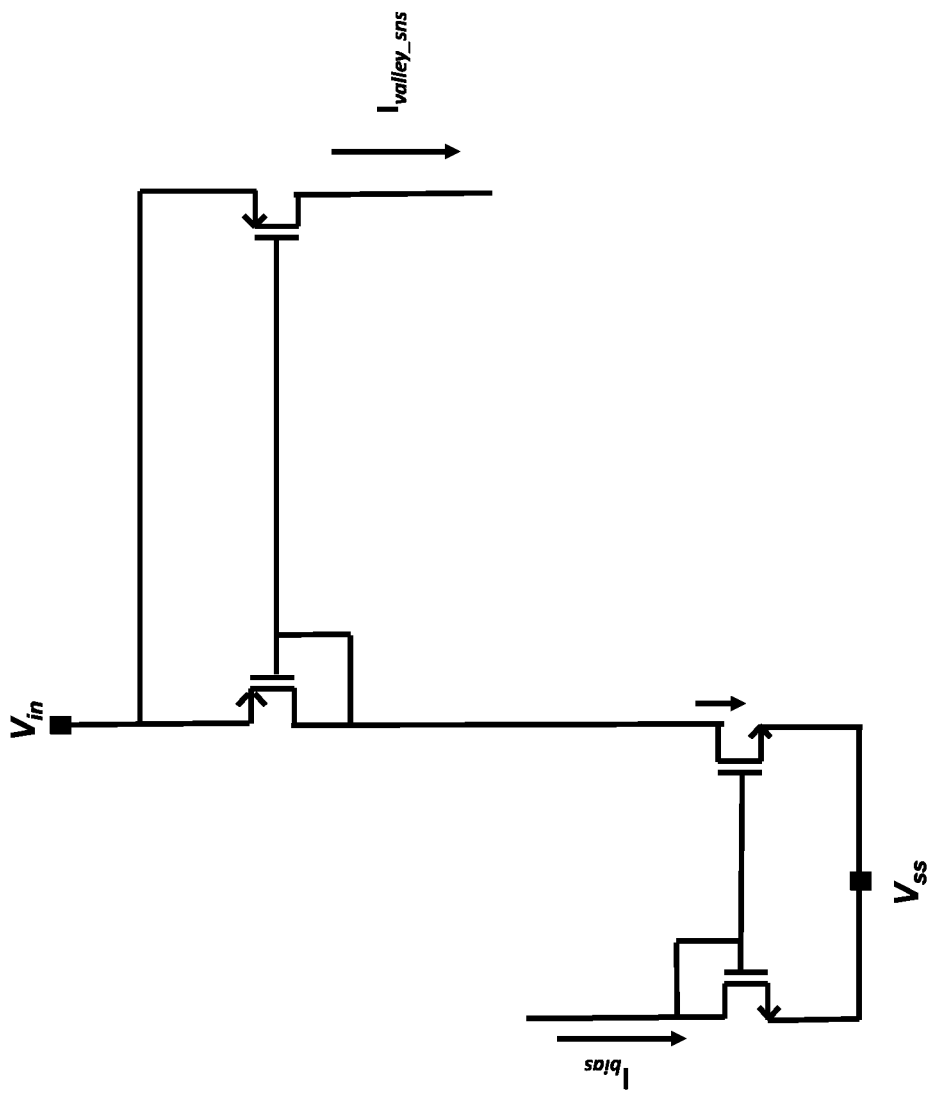
FIG. 11 is a schematic block diagram of one embodiment of the valley sense current source $I_{valley\_sns}$ of FIG. 7.

FIG. 11 is a schematic block diagram of one embodiment of the valley sense current source $I_{valley\_sns}$ of FIG. 7. Bias current $I_{bias}$ is taken as an input current, which is mirrored twice to get the desired $I_{valley\_sns}$ reference current coming from $V_{in}$, in line with what is shown in FIG. 7.

Figure 12:
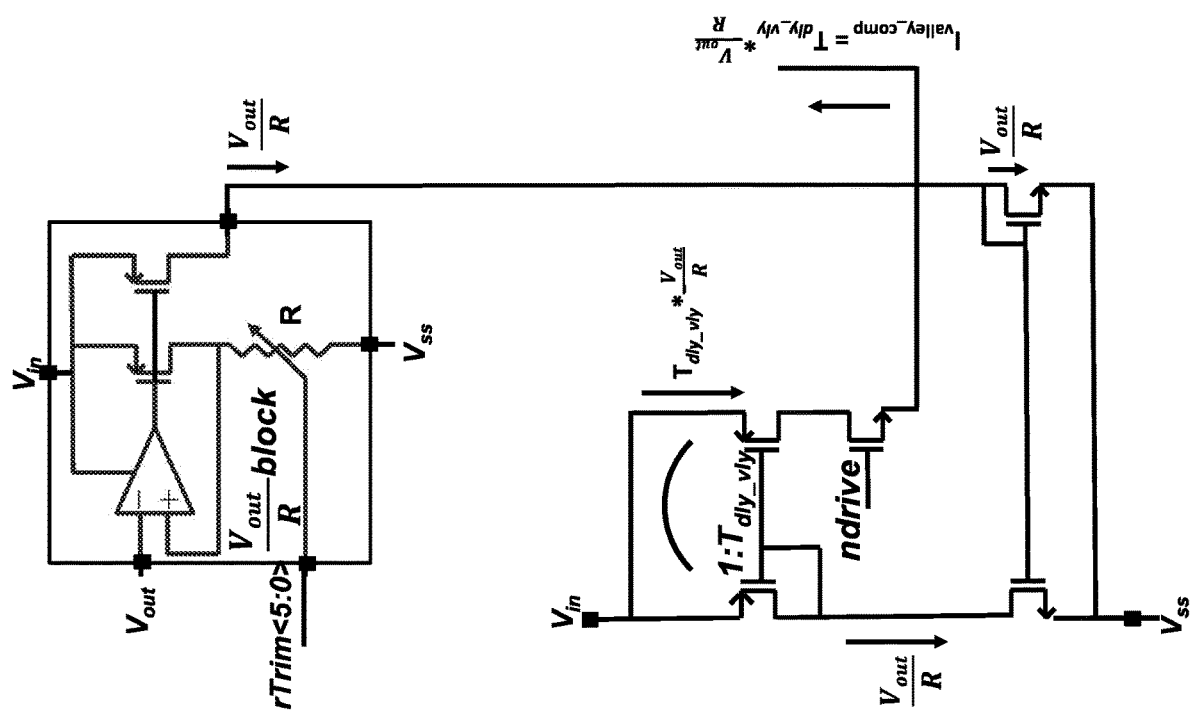
FIG. 12 is a schematic block diagram of one embodiment of the valley compensation current source $I_{valley\_comp}$ of FIG. 7.

FIG. 12 is a schematic block diagram of one embodiment of the valley compensation current source $I_{valley\_comp}$ of FIG. 7. Similar to the circuit in FIG. 9, an opamp-based circuit is used to generate current $V_{out}/R$. This current is mirrored first via a 1:1 mirror to make it flow to $V_{ss}$ to be able to multiply it in the second mirror with value $T_{dly\_vly}$. This current now flows from $V_{in}$, as shown in FIG. 6, and in accordance with Equation (6). Again, R is trimmed to be equal to N*L.

Programmable Valley Current

The preceding description assumed that the desired peak- and valley-current thresholds $I_{peak}$ and $I_{valley}$, respectively, used to detect the ends of the charging and discharging phases of burst-mode charge cycles are fixed for a given application of the DC-DC converter 106 of FIGS. 1 and 2. According to alternative embodiments of this disclosure, the DC-DC converter 106 is capable to operating at two (or more) different, configurable valley-current thresholds $I_{valley}$ and, as a result, at two (or more) different peak-current thresholds $I_{peak}$. For example, in some embodiments, the DC-DC converter 106 is designed to receive a control signal 105 from the controller 104 of FIG. 1 that instructs the DC-DC converter 106 to operate in either a normal-power (NP) mode or a low-power (LP) mode, where the NP mode may correspond to situations in which the DC-DC converter 106 may have to generate relatively high load currents up to the converter's specified maximum allowable load current, while the LP mode may correspond to situations in which the DC-DC converter 106 is operating in its standby mode with little or no load current.

Figure 13:
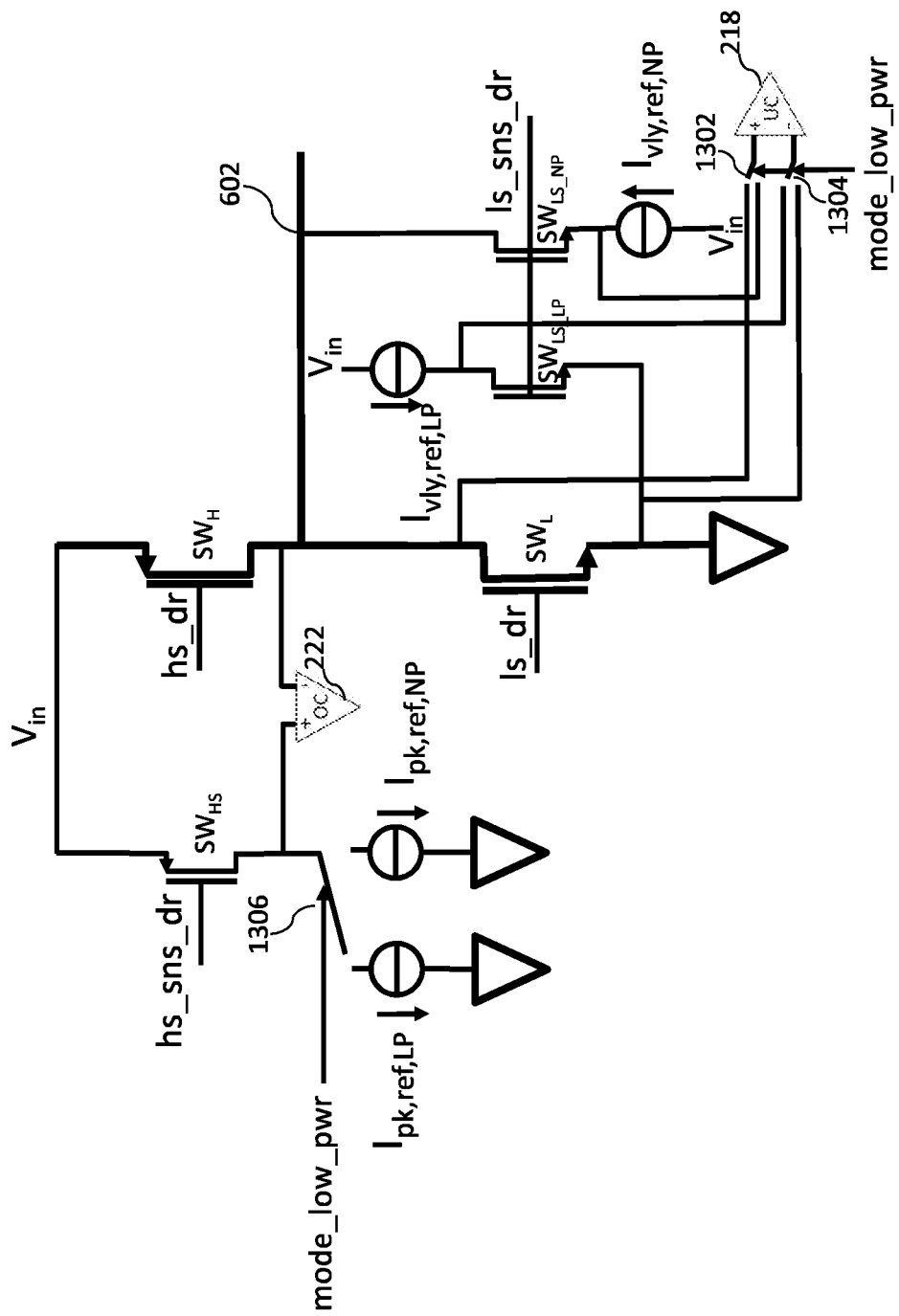
FIG. 13 is a schematic block diagram of a portion of an embodiment of the DC-DC converter of FIGS. 1 and 2 that can be selectively configured to operate in either a normal-power mode or a low-power mode.

FIG. 13 is a schematic block diagram of a portion of an embodiment of the DC-DC converter 106 of FIGS. 1 and 2 that can be selectively configured to operate in either a normal-power mode or a low-power mode. Similar to the embodiments of FIGS. 6 and 7, the embodiment of FIG. 13 includes a high-side power switch $SW_H$, a low-side power switch $SW_L$, a high-side sense switch $SW_{HS}$, a UC comparator 218, and an OC comparator 222. In FIG. 13, the peak reference current source $I_{pk,ref}$ corresponds to the combination of the peak sense current source $I_{pk\_sns}$ and the peak compensation current source $I_{pk\_comp}$ of FIG. 6.

Unlike the embodiment of FIG. 7 which has a single low-side sense switch $SW_{LS}$, the embodiment of FIG. 13 has two low-side sense switches: an NP-mode, n-type FET, low-side sense switch $SW_{LS}$ NP and an LP-mode, n-type FET, low-side sense switch $SW_{LS\_LP}$, where each low-side sense switch has its own discharging-phase reference current source. In particular, the NP-mode discharging-phase reference current source $I_{vly,ref,NP}$ has a combination of (i) an NP valley sense current source analogous to the valley sense current source $I_{valley\_sns}$ of FIG. 7 and (ii) an NP valley compensation current source analogous to the valley compensation current source $I_{valley\_comp}$ of FIG. 7. Similarly, the LP-mode discharging-phase reference current source $I_{vly,ref,LP}$ has a combination of (i) an LP valley sense current source analogous to the valley sense current source $I_{valley\_sns}$ of FIG. 7 and (ii) an LP valley compensation current source analogous to the valley compensation current source $I_{valley\_comp}$ of FIG. 7.

As shown in FIG. 13, the DC-DC converter 106 receives a low-power mode control signal mode_low_pwr (105) from the controller 104 of FIG. 1, which controls positive and negative input switches 1302 and 1304. When the mode_low_pwr is low, indicating that the DC-DC converter 106 is to operate in the NP mode, the switches 1302 and 1304 are set to connect (i) the positive input of the UC comparator 218 to the source of the NP low-side sense switch $SW_{LS\_NP}$ and (ii) the negative input of the UC comparator 218 to ground. In that case, the circuitry of FIG. 13 is configured to operate similar to the circuitry of FIG. 7.

However, when the mode_low_pwr is high, indicating that the DC-DC converter 106 is to operate in the LP mode, the switches 1302 and 1304 are set to connect (i) the positive input to the UC comparator 218 to the drain of the low-side power switch $SW_L$ (i.e., the driver output port 602 of FIGS. 6 and 7) and (ii) the negative input to the UC comparator 218 to the drain of the LP low-side sense switch $SW_{LS\_LP}$. In that case, the circuitry of FIG. 13 is configured to operate differently from the circuitry of FIG. 7. The reason is that, in LP mode, from an efficiency point of view, it is advantageous to use a negative valley current, i.e., a current that pushes the drain of the low-side power switch $SW_L$ above ground. In that case, if the drain of the low-side power switch $SW_L$ is above the drain of the senseFET $SW_{LS\_LP}$, then the comparator 218 should toggle. Having a negative valley current at the moment the low-side power switch $SW_L$ is switched off allows for applying zero-voltage switching of the high-side power switch $SW_H$. Since the valley current is negative, it can charge up the driver output port 602 when both switches are off, and $SW_H$ can be switched on when there is zero voltage across its drain-to-source terminals. This reduces switching losses and thereby improves efficiency, which is especially important in LP mode.

Figure 14:
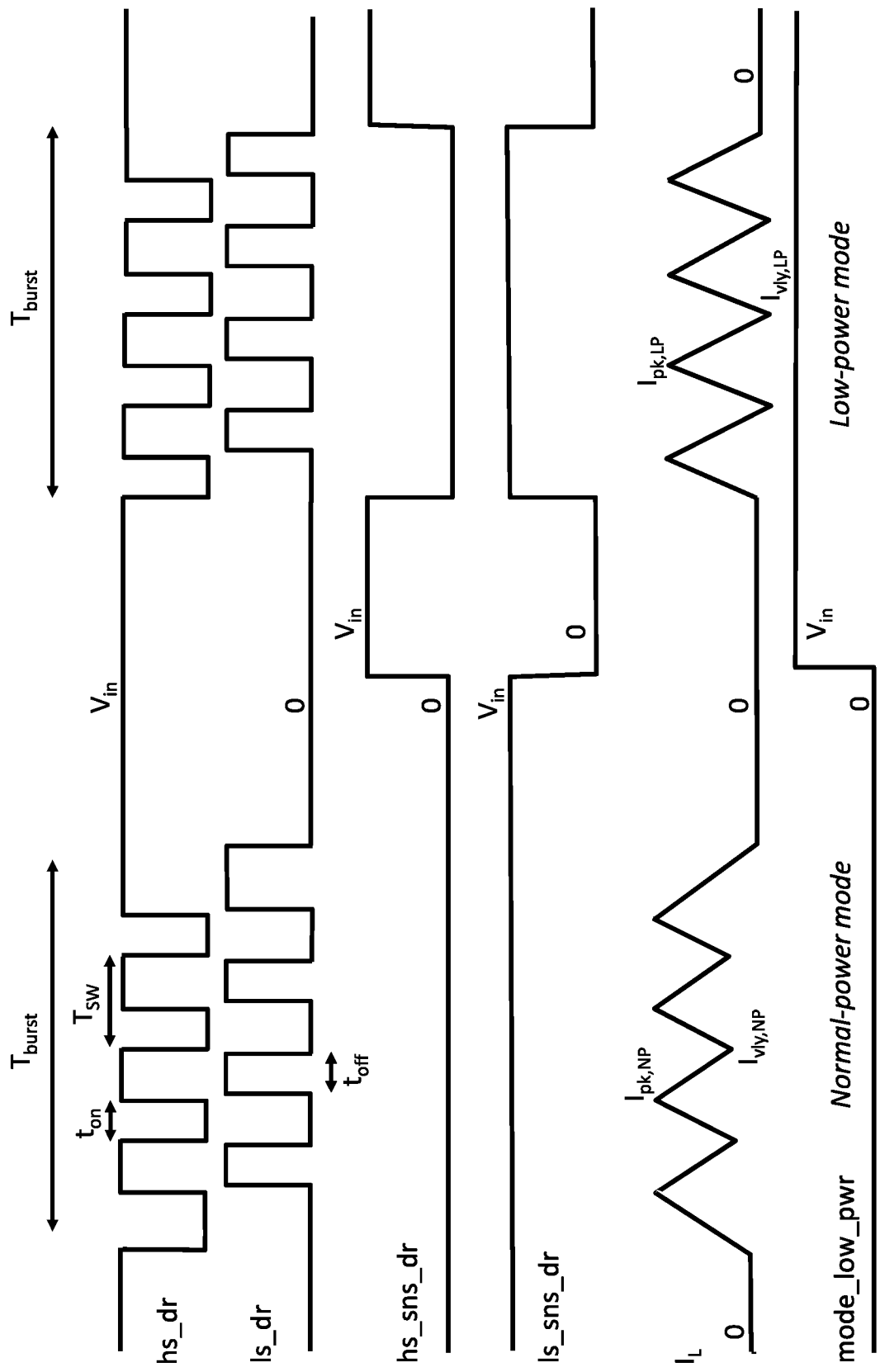
FIG. 14 is a timing diagram of the operations of the DC-DC converter 106 of FIG. 13 for both the normal-power mode and the low-power mode.

FIG. 14 is a timing diagram of the operations of the DC-DC converter 106 of FIG. 13 for both the normal-power mode and the low-power mode. As shown in FIG. 14, during normal-power mode (i.e., when mode_low_pwr is low (e.g., 0)), during a burst, the inductor current $I_L$ cycles back and forth between an NP-mode valley-current threshold $I_{vly\_NP}$ and an NP-mode peak-current threshold $I_{pk,NP}$. Similarly, during low-power mode (i.e., when mode_low_pwr is high (e.g., $V_{in}$)), during a burst, the inductor current $I_L$ cycles back and forth between an LP-mode valley-current threshold $I_{vly,LP}$ and an LP-mode peak-current threshold $I_{pk,LP}$, where (i) the LP-mode valley-current threshold $I_{vly,LP}$ is lower than the NP-mode valley-current threshold $I_{vly,NP}$ and (ii) the LP-mode peak-current threshold $I_{pk,LP}$ is lower than the NP-mode peak-current threshold $I_{pk,NP}$, such that overall power consumption is lower during LP-mode than during NP-mode, thereby avoiding inefficient standby power consumption when the DC-DC converter 106 is driving little or no output load. In particular, making the LP-mode valley-current threshold $I_{vly,LP}$ slightly negative, as is shown in FIG. 14, enables zero-voltage switching when switching on the high-side power switch $SW_H$ to start the next charging phase. This reduces switching losses and therefore increases efficiency.

For example, in one possible implementation, the NP-mode valley-current threshold $I_{vly,NP}$ is 30 mA and the LP-mode valley-current threshold $I_{vly,LP}$ is −15 mA.

Note that, as indicated in FIG. 14 by the drive signals hs_sns_dr and ls_sns_dr, in this implementation of the DC-DC converter 106 of FIG. 13, in NP mode, the high-side and low-side sense switches $SW_{HS}$ and $SW_{LS}$ are always on, both during a burst and during an off-burst. On the other hand, in LP mode, although the high-side and low-side sense switches $SW_{HS}$ and $SW_{LS}$ are both on during a burst, they are both off during an off-burst. This prevents losing power between bursts due to the reference currents in the senseFETs flowing and thereby increases efficiency.

In order to generate the valley current references $I_{vly,ref,NP}$ and $I_{vly,ref,LP}$ shown in FIG. 13, circuits as shown in FIG. 11 are used, where either a single circuit may generate two different reference currents based on the same bias current, by having two differently scaled outputs of the output current mirror, or two separate circuits are used. Compensation of the references to deal with delays of comparators, controller, and drivers may be implemented using the circuitry of FIG. 12, where only one such circuit is used (i.e., the same compensation current is used for both NP and LP mode). In order to generate the peak current references $I_{pk,ref,NP}$ and $I_{pk,ref,LP}$ in FIG. 13, circuits as shown in FIG. 9 are used, where either the same deltaI current can be added to the corresponding valley current $I_{vly,ref,NP}$ or $I_{vly,ref,LP}$, respectively, in both modes, or a different deltaI current can be added in the two different modes. An example of the latter situation would be to deny the use of frequency control via the deltaI circuit in LP mode, which instead of a $V_{in}$-dependent and $V_{out}$-dependent ripple current deltaI current used when frequency control is used, would add a deltaI current that is constant over $V_{in}$ and $V_{out}$ variations. A reason to do this would be to limit power consumption of blocks to increase efficiency in LP mode, and generating a constant deltaI current is simpler, i.e., requiring less circuitry and therefore less power, than a $V_{in}$-dependent and $V_{out}$-dependent deltaI current used for frequency control as shown in FIG. 9. As is the case for the valley currents, compensation of the references to deal with delay of comparators, controller, and drivers may be implemented using the circuitry of FIG. 10, where only one such circuit is used (i.e., the same compensation current is used for both NP and LP mode).

Embodiments of this disclosure have been described in the context of buck-type DC-DC converters having two power switches (i.e., a high-side power switch $SW_H$ and a low-side power switch $SW_L$), an inductor, and a capacitor configured to be connected to provide output voltage to a load. Those skilled in the art will understand that alternative embodiments of this disclosure may be two-switch boost-type DC-DC converters, two-switch or four-switch buck/boost-type DC-DC converters, or two-switch Cuk-type DC-DC converters, all of which have (at least) one inductor and (at least) one capacitor configured to be connected to provide output voltage to a load. Note that a Cuk DC-DC converter has two inductors and two capacitors. Note that, in some implementations of these different types of DC-DC converters, at least one of the switches may be implemented using a diode.

Furthermore, as understood by those skilled in the art, each of those different types of DC-DC converters has a control switch that is turned on for the charging phase and a synchronous-rectification (SR) switch that is turned on for the discharging phase. The latter switch then replaces the diode in the basic circuit configuration. In the buck converters described above, the high-side power switch $SW_H$ is the control switch, and the low-side power switch $SW_L$ is the synchronous-rectification (SR) switch. In a boost DC-DC converter, the control switch is a low-side power switch, and the SR switch is a high-side power switch. In a buck/boost DC-DC converter, both the control switch and the SR switch are high-side power switches, and, in a Cuk DC-DC converter, both the control switch and the SR switch are low-side power switches.

Although embodiments have been described that have two operating modes, i.e., (i) a normal-power (NP) mode having an NP-mode valley current and an NP-mode peak current and (ii) a low-power (LP) mode having an LP-mode valley current and an LP-mode peak current, where the LP-mode valley current is negative, in general, embodiments may have two or more different operating modes, each having a corresponding pair of valley and peak currents, where each valley current may be positive, negative, or zero.

According to certain embodiments, the disclosure describes circuitry comprising a DC-DC converter. When an inductance and a capacitance are connected to the DC-DC converter, the DC-DC converter is configured to convert an input voltage into an output voltage at an output port to drive a load connected to the output port. The DC-DC converter is configured to operate in a burst mode comprising at least one charge cycle comprising a charging phase followed by a discharging phase. The charging phase is terminated when an inductor current flowing through the inductance reaches a compensated peak-current threshold, wherein the compensated peak-current threshold compensates for charging-phase loop delay. The discharging phase is terminated when the inductor current reaches a compensated valley-current threshold, wherein the compensated valley-current threshold compensates for discharging-phase loop delay.

According to certain embodiments, the disclosure describes a method for operating a DC-DC converter in burst mode. The method comprises, for at least one burst-mode charge cycle, charging an inductance and a capacitance connected to the DC-DC converter until an inductor current flowing through the inductance reaches a compensated peak-current threshold, wherein the compensated peak-current threshold compensates for charging-phase loop delay and discharging the inductance until the inductor current reaches a compensated valley-current threshold, wherein the compensated valley-current threshold compensates for discharging-phase loop delay.

According to certain embodiments of the above, the circuitry is an integrated circuit comprising the DC-DC converter and the inductance and the capacitance are external to the integrated circuit.

According to certain embodiments of the above, the DC-DC converter comprises an output driver configured to selectively charge the inductance and the capacitance; a control circuit configured to control the output driver; comparator circuitry configured to generate feedback signals to the control circuit for use in controlling the output driver; and current generation circuitry configured to generate reference currents for the comparator circuitry. The current generation circuitry is configured to generate a charging-phase reference current corresponding to the compensated peak-current threshold, and the comparator circuitry is configured to compare the charging-phase reference current to a current corresponding to the inductor current to determine when to terminate the charging phase of a burst-mode charge cycle. The current generation circuitry is configured to generate a discharging-phase reference current corresponding to the compensated valley-current threshold, and the comparator circuitry is configured to compare the discharging-phase reference current to a current corresponding to the inductor current to determine when to terminate the discharging phase of a burst-mode charge cycle.

According to certain embodiments of the above, the output driver comprises a high-side power switch connected between the input voltage and the inductance; a low-side power switch connected between the inductance and ground, wherein the high-side power switch, the inductance, the low-side power switch, and a first input to an over-current comparator of the comparator circuitry are interconnected at a first node (e.g., 602); a high-side sense switch connected between the input voltage and a second input to the over-current comparator, wherein the charging-phase reference current is applied to the second input to the over-current comparator;

and a low-side sense switch connected between the first node and a first input to an under-current comparator of the comparator circuitry, wherein (i) the discharging-phase reference current is applied to the first input of the under-current comparator and (ii) a second input to the under-current comparator is connected to ground.

According to certain embodiments of the above, the current generation circuitry is configured to generate the charging-phase reference current as a function of the charging-phase loop delay, the input voltage, the output voltage, and the inductance and the current generation circuitry is configured to generate the discharging-phase reference current as a function of the discharging-phase loop delay, the output voltage, and the inductance.

According to certain embodiments of the above, the current generation circuitry comprises a peak sense current source configured to generate a peak sense current that is independent on the charging-phase loop delay; a peak compensation current source configured to generate a peak compensation current that is dependent on the charging-phase loop delay, wherein the charging-phase reference current is based on the peak sense current and the peak compensation current; a valley sense current source configured to generate a valley sense current that is independent on the discharging-phase loop delay; and a valley compensation current source configured to generate a valley compensation current that is dependent on the discharging-phase loop delay, wherein the discharging-phase reference current is based on the valley sense current and the valley compensation current.

According to certain embodiments of the above, the compensated peak-current threshold is lower than the inductor current when the output driver is turned off at the end of a charging phase and the compensated valley-current threshold is higher than the inductor current when the output driver is turned on at the end of a discharging phase.

It is further noted that the functional blocks, components, systems, devices, or circuitry described herein can be implemented using hardware, software, or a combination of hardware and software along with analog circuitry as needed. For example, the disclosed embodiments can be implemented using one or more integrated circuits that are programmed to perform the functions, tasks, methods, actions, or other operational features described herein for the disclosed embodiments. The one or more integrated circuits can include, for example, one or more processors or configurable logic devices (CLDs) or a combination thereof. The one or more processors can be, for example, one or more central processing units (CPUs), controllers, microcontrollers, microprocessors, hardware accelerators, ASIC s (application specific integrated circuit), or other integrated processing devices. The one or more CLDs can be, for example, one or more CPLDs (complex programmable logic devices), FPGAs (field programmable gate arrays), PLAs (programmable logic array), reconfigurable logic circuits, or other integrated logic devices. Further, the integrated circuits, including the one or more processors, can be programmed to execute software, firmware, code, or other program instructions that are embodied in one or more non-transitory tangible computer-readable mediums to perform the functions, tasks, methods, actions, or other operational features described herein for the disclosed embodiments. The integrated circuits, including the one or more CLDs, can also be programmed using logic code, logic definitions, hardware description languages, configuration files, or other logic instructions that are embodied in one or more non-transitory tangible computer-readable mediums to perform the functions, tasks, methods, actions, or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, or any other non-transitory tangible computer-readable mediums. Other variations can also be implemented while still taking advantage of the techniques described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. Circuitry comprising a DC-DC converter, wherein:
   when an inductance and a capacitance are connected to the DC-DC converter, the DC-DC converter is configured to convert an input voltage into an output voltage at an output port to drive a load connected to the output port;
   the DC-DC converter is configured to operate in a burst mode comprising at least one charge cycle comprising a charging phase followed by a discharging phase;
   the charging phase is terminated when an inductor current flowing through the inductance reaches a compensated peak-current threshold, wherein the compensated peak-current threshold compensates for charging-phase loop delay; and
   the discharging phase is terminated when the inductor current reaches a compensated valley-current threshold, wherein the compensated valley-current threshold compensates for discharging-phase loop delay.

2. The circuitry of claim 1, wherein:
   the circuitry is an integrated circuit comprising the DC-DC converter; and
   the inductance and the capacitance are external to the integrated circuit.

3. The circuitry of claim 1, wherein the DC-DC converter comprises:
   an output driver configured to selectively charge the inductance and the capacitance;
   a control circuit configured to control the output driver;
   comparator circuitry configured to generate feedback signals to the control circuit for use in controlling the output driver; and
   current generation circuitry configured to generate reference currents for the comparator circuitry, wherein:
      the current generation circuitry is configured to generate a charging-phase reference current corresponding to the compensated peak-current threshold, and the comparator circuitry is configured to compare the charging-phase reference current to a current corresponding to the inductor current to determine when to terminate the charging phase of a burst-mode charge cycle; and
      the current generation circuitry is configured to generate a discharging-phase reference current corresponding to the compensated valley-current threshold, and the comparator circuitry is configured to compare the discharging-phase reference current to a current corresponding to the inductor current to determine when to terminate the discharging phase of a burst-mode charge cycle.

4. The circuitry of claim 3, wherein the output driver comprises:
   a high-side power switch connected between the input voltage and the inductance;
   a low-side power switch connected between the inductance and ground, wherein the high-side power switch, the inductance, the low-side power switch, and a first input to an over-current comparator of the comparator circuitry are interconnected at a first node (e.g., 602);
   a high-side sense switch connected between the input voltage and a second input to the over-current comparator, wherein the charging-phase reference current is applied to the second input to the over-current comparator; and
   a low-side sense switch connected between the first node and a first input to an under-current comparator of the comparator circuitry, wherein (i) the discharging-phase reference current is applied to the first input of the under-current comparator and (ii) a second input to the under-current comparator is connected to ground.

5. The circuitry of claim 3, wherein:
   the current generation circuitry is configured to generate the charging-phase reference current as a function of the charging-phase loop delay, the input voltage, the output voltage, and the inductance; and
   the current generation circuitry is configured to generate the discharging-phase reference current as a function of the discharging-phase loop delay, the output voltage, and the inductance.

6. The circuitry of claim 3, wherein the current generation circuitry comprises:
   a peak sense current source configured to generate a peak sense current that is independent on the charging-phase loop delay;
   a peak compensation current source configured to generate a peak compensation current that is dependent on the charging-phase loop delay, wherein the charging-phase reference current is based on the peak sense current and the peak compensation current;

a valley sense current source configured to generate a valley sense current that is independent on the discharging-phase loop delay; and a valley compensation current source configured to generate a valley compensation current that is dependent on the discharging-phase loop delay, wherein the discharging-phase reference current is based on the valley sense current and the valley compensation current.

7. The circuitry of claim 1, wherein:

the compensated peak-current threshold is lower than the inductor current when the output driver is turned off at the end of a charging phase; and the compensated valley-current threshold is higher than the inductor current when the output driver is turned on at the end of a discharging phase.

8. A method for operating a DC-DC converter in burst mode, the method comprising, for at least one burst-mode charge cycle:

charging an inductance and a capacitance connected to the DC-DC converter until an inductor current flowing through the inductance reaches a compensated peak-current threshold, wherein the compensated peak-current threshold compensates for charging-phase loop delay; and discharging the inductance until the inductor current reaches a compensated valley-current threshold, wherein the compensated valley-current threshold compensates for discharging-phase loop delay.

9. The method of claim 8, wherein:

the DC-DC converter is implemented in an integrated circuit; and the inductance and the capacitance are external to the integrated circuit.

10. The method of claim 8, wherein the DC-DC converter comprises:

an output driver that selectively charges the inductance and the capacitance;

a control circuit that controls the output driver;

comparator circuitry that generates feedback signals to the control circuit for use in controlling the output driver; and current generation circuitry that generates reference currents for the comparator circuitry, wherein:

the current generation circuitry generates a charging-phase reference current corresponding to the compensated peak-current threshold, and the comparator circuitry compares the charging-phase reference current to a current corresponding to the inductor current to determine when to terminate the charging phase of a burst-mode charge cycle; and the current generation circuitry generates a discharging-phase reference current corresponding to the compensated valley-current threshold, and the comparator circuitry compares the discharging-phase reference current to a current corresponding to the inductor current to determine when to terminate the discharging phase of a burst-mode charge cycle.

11. The method of claim 10, wherein the output driver comprises:

a high-side power switch connected between the input voltage and the inductance;

a low-side power switch connected between the inductance and ground, wherein the high-side power switch, the inductance, the low-side power switch, and a first input to an over-current comparator of the comparator circuitry are interconnected at a first node (e.g., 602);

a high-side sense switch connected between the input voltage and a second input to the over-current comparator, wherein the charging-phase reference current is applied to the second input to the over-current comparator; and a low-side sense switch connected between the first node and a first input to an under-current comparator of the comparator circuitry, wherein (i) the discharging-phase reference current is applied to the first input of the under-current comparator and (ii) a second input to the under-current comparator is connected to ground.

12. The method of claim 10, wherein:

the current generation circuitry generates the charging-phase reference current as a function of the charging-phase loop delay, the input voltage, the output voltage, and the inductance; and the current generation circuitry generates the discharging-phase reference current as a function of the discharging-phase loop delay, the output voltage, and the inductance.

13. The method of claim 10, wherein the current generation circuitry comprises:

a peak sense current source that generates a peak sense current that is independent on the charging-phase loop delay;

a peak compensation current source that generates a peak compensation current that is dependent on the charging-phase loop delay, wherein the charging-phase reference current is based on the peak sense current and the peak compensation current;

a valley sense current source that generates a valley sense current that is independent on the discharging-phase loop delay; and a valley compensation current source that generates a valley compensation current that is dependent on the discharging-phase loop delay, wherein the discharging-phase reference current is based on the valley sense current and the valley compensation current.

14. The method of claim 8, wherein:

the compensated peak-current threshold is lower than the inductor current when the output driver is turned off at the end of a charging phase; and the compensated valley-current threshold is higher than the inductor current when the output driver is turned on at the end of a discharging phase.

\* \* \* \* \*